(12) United States Patent
Mori et al.

(10) Patent No.: US 7,972,003 B2
(45) Date of Patent: Jul. 5, 2011

(54) VISIBLE IN-VEHICLE LASER BEAM PROJECTION SYSTEM WITH CONTROLLED TRAJECTORIES TO GUIDE VEHICLE OPERATOR

(75) Inventors: Kenichi Mori, Suzuka (JP); Yoshihisa Sato, Nagoya (JP); Tetsuya Enokizaka, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 552 days.

(21) Appl. No.: 12/055,736

(22) Filed: Mar. 26, 2008

(65) Prior Publication Data

US 2008/0238640 A1    Oct. 2, 2008

(30) Foreign Application Priority Data

Mar. 26, 2007    (JP) .................................. 2007-78530

(51) Int. Cl.
  *G03B 21/00*    (2006.01)
(52) U.S. Cl. ............................ 353/12; 353/13
(58) Field of Classification Search ............... 353/13, 353/14, 11, 12; 340/441, 461; 345/7, 8; 359/630–633; 348/115
  See application file for complete search history.

(56) References Cited

U.S. PATENT DOCUMENTS 6,348,877 B1 * 2/2002 Berstis et al. ................. 340/980
7,275,831 B2   10/2007 Knoll et al.

FOREIGN PATENT DOCUMENTS

| DE | 103 34 720 A1 | 3/2005 |
|----|---------------|--------|
| JP | 09-210716 | 8/1997 |
| JP | 2003-165404 | 6/2003 |
| JP | 2003-291688 | 10/2003 |
| JP | 2004-262363 | 9/2004 |
| WO | WO 2008/087832 | 7/2008 |

OTHER PUBLICATIONS

Kawai et al.: "Visible Laser Beam Projector," U.S. Appl. No. 12/071,212, filed Feb. 19, 2008.
Mori et al.: "Visible Laser Beam Projection System and Method of Mounting Visible Laser Beam Projection Device," U.S. Appl. No. 12/055,710, filed Mar. 26, 2008.
U.S. Appl. No. 12/055,710 of MORI filed Mar. 26, 2008; corresponds to JP Appln No. 2007-81202.
U.S. Appl. No. 12/149,146 of MORI filed Apr. 28, 2008; corresponds to JP Appln No. 2007-141476.
Japanese Office Action dated Nov. 10, 2010, re JP 2008-070893 (both Japanese and English versions attached).

* cited by examiner

*Primary Examiner* — Thanh X Luu
(74) *Attorney, Agent, or Firm* — Nixon & Vanderhye PC

(57) ABSTRACT

A visible laser beam projection system determines a target point of position to which a visible laser beam is to be projected, a start point and a trajectory from the start point and the target point based on data of conditions inside and outside of a vehicle. The system starts projecting the visible laser beam from the start point, moves the visible laser beam while it is being projected along the trajectory and stops the projection of the visible laser beam. The start point, target point and the trajectory may be changed depending on contents to be indicated.

18 Claims, 15 Drawing Sheets

| LASER BEAM START POINT | INSTRUMENT PANEL | PILLAR |
|---|---|---|
| CONTENT | ·WARNING (METER)<br>·INDICATION (METER)<br>·DOZING DETECTION<br>　(NAVI. DISPLAY) | ROUTE GUIDE (NAVI)<br>CLEARANCE SONAR (NAVI)<br>REAR VIEW (NAVI)<br>PHONE CALL (NAVI)<br>ETC CHARGE (NAVI)<br>MAINTENANCE (NAVI) |

| LOCUS | SPIRAL | ROTARY | RECIPROCAL |
|---|---|---|---|
| REQUIRED DRIVER ACTION | WATCH DISPLAY | OPERATE SWITCH | STEER, ACCELERATE, BRAKE |
| CONTENT | WARNING, INDICATION, ETC CHARGE, MAINTENANCE | CALL RECEPTION | ROUTE GUIDE, CLEARANCE DISPLAY, REAR VIEW DISPLAY DOZING DETECTION |

FIG. 7

| LOCUS | PERSON | TWO-WHEELD VEHICLE |
|---|---|---|
| MOVING FROM RIGHT TO LEFT | TWO LIGHT SPOTS ALTERNATELY FROM RIGHT TO LEFT ON PANEL | TWO CIRCLES MOVING FROM RIGHT TO LEFT ON PANEL |
| MOVING FROM LEFT TO RIGHT | TWO LIGHT SPOTS ALTERNATELY FROM LEFT TO RIGHT ON PANEL | TWO CIRCLES MOVING FROM LEFT TO RIGHT ON PANEL |
| APPROACHING FROM FRONT | TWO LIGHT SPOTS ALTERNATELY MOVING TOWARD DRIVER IN CENTER ON PANEL | TWO CIRCLES MOVING TOWARD DRIVER IN CENTER ON PANEL |
| APPROACHING FROM RIGHT REAR | TWO LIGHT SPOTS ALTERNATELY MOVING FROM REAR TO FRONT AT RIGHT END ON PANEL | TWO CIRCLES MOVING FROM REAR TO FRONT AT RIGHT END ON PANEL |
| APPROACHING FROM LEFT REAR | TWO LIGHT SPOTS ALTERNATELY MOVING AT LEFT END ON PANEL | TWO CIRCLES MOVING FROM REAR TO FRONT AT LEFT END ON PANEL |

FIG. 8

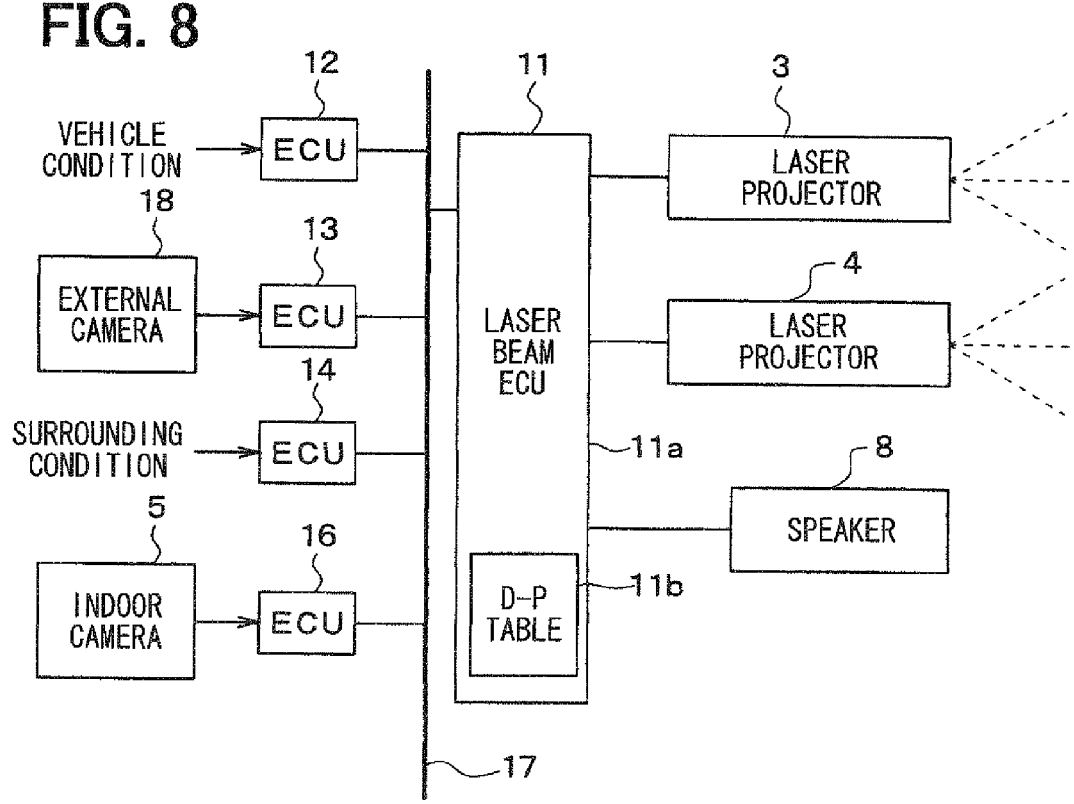

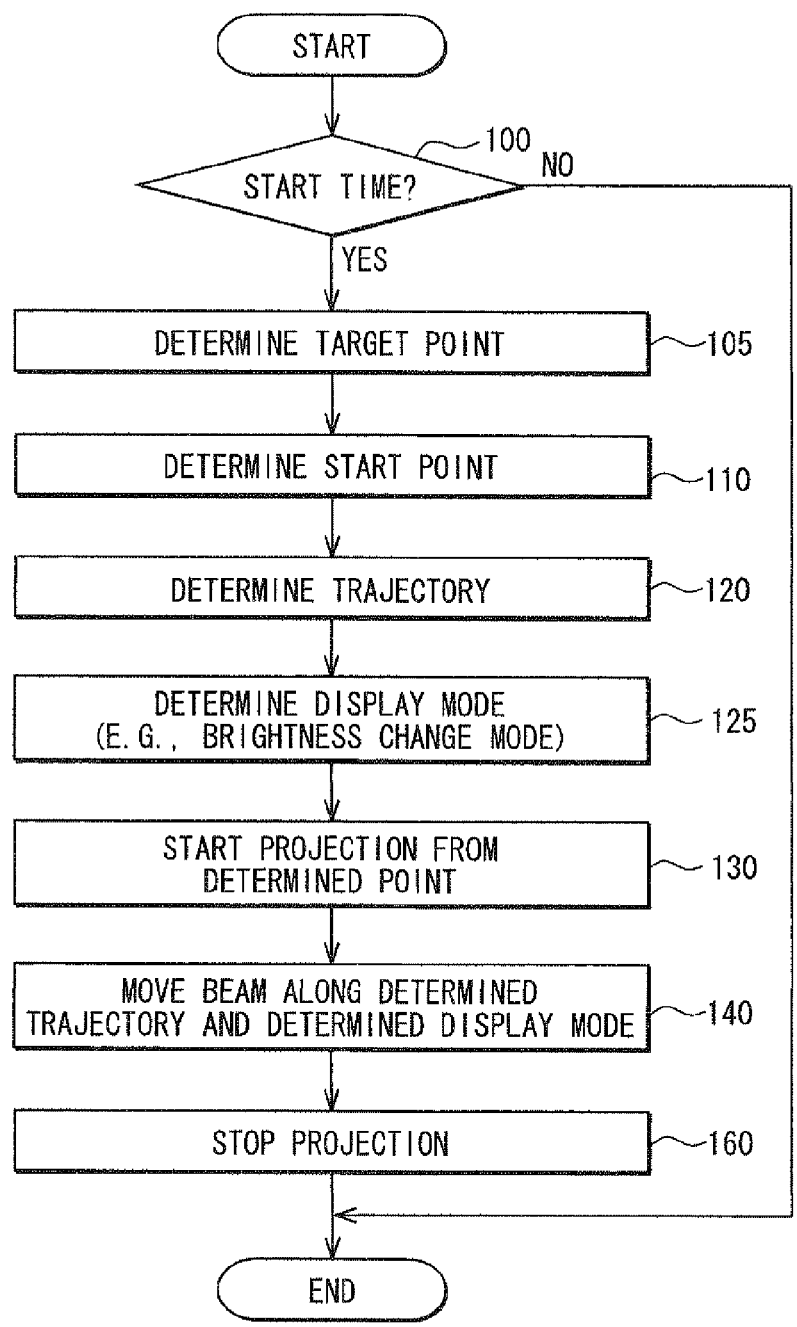

| PROJECTION SHAPE | CIRCLE | RECTANGLE |
|---|---|---|
| OBJECT | PHONE BUTTON | HAZARD SWITCH |

# VISIBLE IN-VEHICLE LASER BEAM PROJECTION SYSTEM WITH CONTROLLED TRAJECTORIES TO GUIDE VEHICLE OPERATOR

CROSS REFERENCE TO RELATED APPLICATION

This application relates to and incorporates herein by reference Japanese Patent Application No. 2007-78530 filed on Mar. 26, 2007.

FIELD OF THE INVENTION

The present invention relates to a visible laser beam projection system for projecting a visible laser beam onto a portion in a compartment of a vehicle to provide information to a driver or a passenger aboard the vehicle.

BACKGROUND OF THE INVENTION

It has been proposed to draw a picture on a road surface by projecting a visible laser beam from a front end of a vehicle onto a road surface (for example, JP 9-210716A).

It is often desired to provide information to a passenger such as a driver aboard a vehicle by projecting a visible laser beam not to the outside of the vehicle but to an inside of a compartment of the vehicle. In this case, the information can be recognized more easily, if various meanings are attached to the forms of displaying the visible laser beam.

SUMMARY OF THE INVENTION

It is an object of the present invention to provide a visible laser beam projection system that provides various meanings to the form of displaying a visible laser beam in a compartment of a vehicle to provide information to a passenger aboard the vehicle.

According to the present exemplary embodiments, a visible laser beam projection system is mounted in a compartment of a vehicle, and includes a laser projector and a control unit. The laser projector projects a visible laser beam in the compartment, and the control unit controls a turn on/off of projection of the laser projector and a projection direction thereof. The control unit changes a start point of projection, a target point of projection and a trajectory of moving the projected beam based on inside and outside conditions of the vehicle.

BRIEF DESCRIPTION OF THE DRAWINGS

The above and other objects, features and advantages of the present invention will become more apparent from the following detailed description made with reference to the accompanying drawings. In the drawings:

FIG. 7 is a table showing a method of selecting a trajectory according to a second embodiment of the present invention;

FIG. 8 is a block diagram showing an electric part of the visible laser beam projection system according to the second embodiment;

FIG. 12 is a flowchart showing processing executed by a laser beam ECU of a laser beam projection system according to a third embodiment of the present invention;

FIG. 13 is a table showing a correspondence between positions to which the visible laser beam is projected and diffusion rates of flux of light;

DESCRIPTION OF THE PREFERRED EMBODIMENTS

First Embodiment

Figure 1:
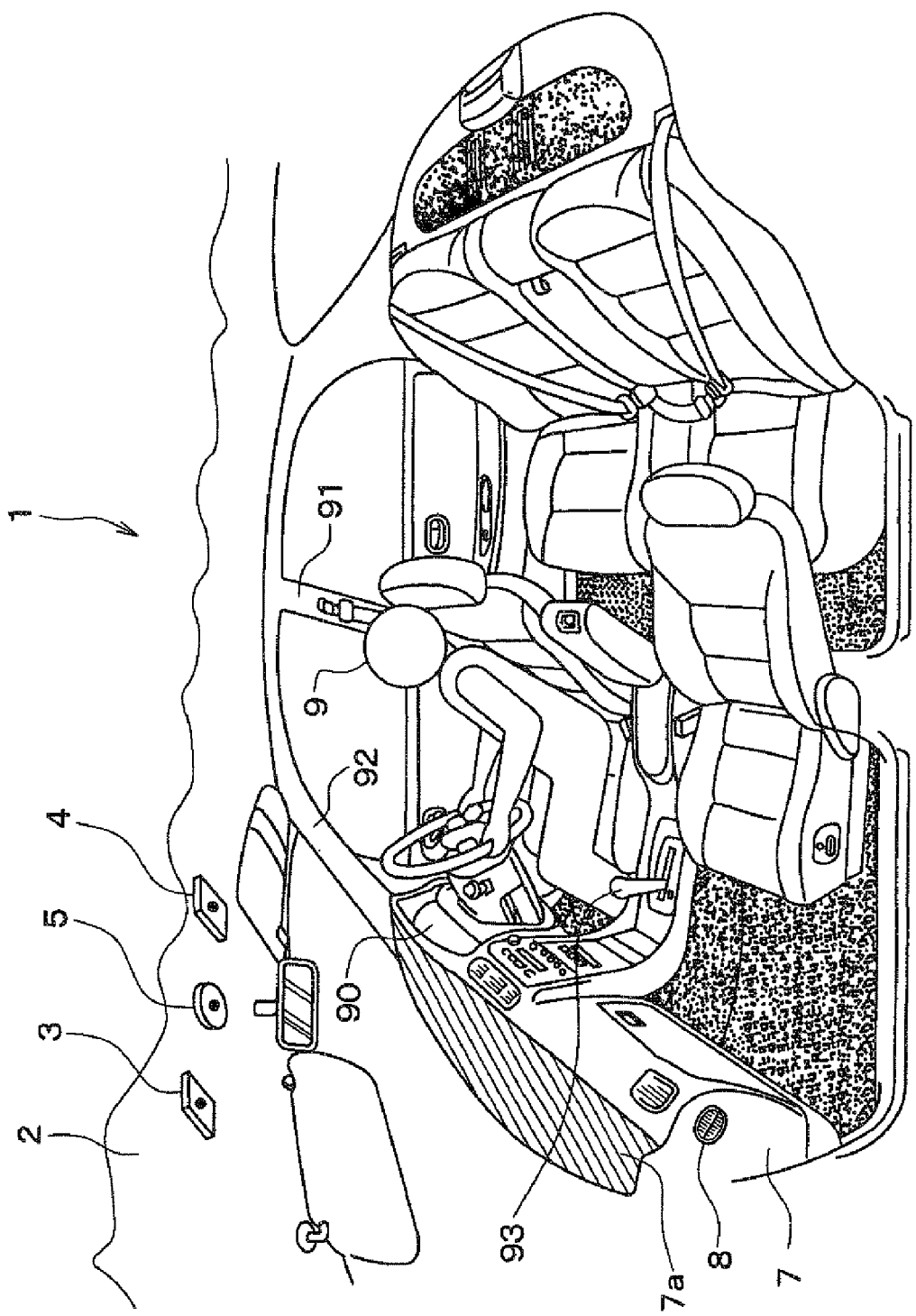
FIG. 1 is a perspective view schematically showing a visible laser beam projection system according to a first embodiment of the present invention.
Figures 2, 4:
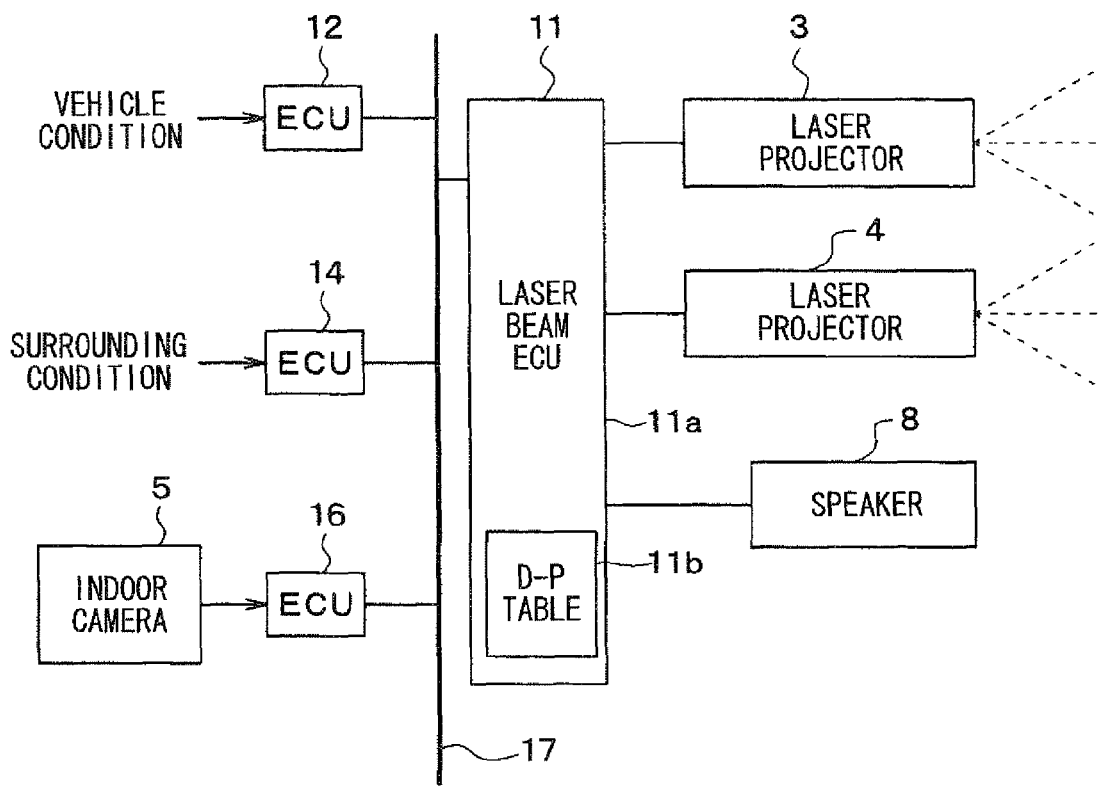
FIG. 2 is a block diagram showing an electrical part of the visible laser beam projection system according to the first embodiment.
FIG. 4 is a table showing a correspondence between conditions inside/outside of a vehicle serving as a cause for projecting a visible laser beam and start points of projection in the first embodiment.

A visible laser beam projection system according to a first embodiment is shown in FIGS. 1 and 2. The visible laser beam projection system is mounted in a compartment 1 of a vehicle, and includes a laser projector 3, a laser projector 4, an indoor camera 5, a speaker 8, a laser beam electronic control unit (ECU) 11, various ECUs 12, 14 and 16, and a communication line 17 for communication among the ECUs 12, 14 and 16.

The laser projectors 3 and 4 for projecting visible laser beams are mounted near a front end of a ceiling portion 2 in the compartment 1, so that projection of the visible laser beams may be turned on and off and the direction of projection may be changed by the laser beam ECU 11. As a drive mechanism, for changing the directions of projection, a motor drive mechanism may be employed. The directions of projection of the laser projectors 3 and 4 will be, for example, toward an upper surface 7a of an instrument panel 7, a meter 90, a right center pillar 91, a right front pillar 92 and a drive position lever 93.

The indoor camera 5 is mounted near the front end of the ceiling portion 2 in the compartment 1, repetitively takes a picture of the face of a driver 9 in the compartment 1, and outputs the image which is a result of taking the picture to the ECU 16. By using a known image recognition technology for the image taken by the indoor camera 5, the ECU 16 checks whether the driver is dozing at a steering wheel. If it is determined that the driver is dozing, the ECU 16 sends, to the laser beam ECU 11, a visible laser beam projection instruction signal so as to project the visible laser beam onto the display of a vehicle navigation device (not shown) in the compartment. The visible laser beam projection instruction signal includes information of conditions inside and outside of the vehicle (specifically, information related to dozing), which is a cause for producing the visible laser beam projection instruction signal.

Based on signals from various sensors (not shown) in the vehicle, the ECU 12 calculates information related to the conditions of the vehicle (information in the vehicle), checks whether a display by the visible laser beam is necessary based on the information that is calculated. If it is determined that the display is necessary, the ECU 12 specifies an object to which the laser beam is to be projected, and sends, to the laser beam ECU 11, a visible laser beam projection instruction signal inclusive of information of the specified object to which the laser beam is to be projected. The visible laser beam projection instruction signal includes the information of conditions inside and outside of the vehicle, which is a cause for producing the visible laser beam projection instruction signal. Described below is a relationship between a case when the visible laser beam projection instruction signal must be transmitted and the object to which the laser beam is to be projected in that case.

That is, when, for example, the meter 90 displays some warning (e.g., door is open, engine cooling water temperature is in excess of a predetermined temperature, the amount of gasoline is less than a predetermined amount), the ECU 12 produces a visible laser beam projection instruction signal to project the visible laser beam onto a portion that displays the warning. Further, if the meter 90 displays some indication, the ECU 12 produces a visible laser beam projection instruction signal to project the visible laser beam onto a portion that displays the indication. Further, when, for example, the vehicle navigation device (not shown) guides a travel route, the ECU 12 produces a visible laser beam projection instruction signal to project the visible laser beam onto a display of the navigation device. Further, if a telephone (not shown) in the vehicle has received a call, the ECU 12 produces a visible laser beam projection instruction signal to project the visible laser beam onto a receiver button of the telephone. Further, if, for example, a bill of an electronic toll collection (ETC) device (not shown) mounted in the vehicle is charged, the ECU 12 produces a visible laser beam projection instruction signal to project the visible laser beam onto a display of the ETC device mounted on the vehicle. Further, if various kinds of maintenance are required (e.g., changing engine oil, changing a filter), the ECU 12 produces a visible laser beam projection instruction signal to project the visible laser beam onto the display portions corresponding to the items of maintenance of the meter 90.

Based on the signals from various sensors (not shown) in the vehicle, the ECU 14 calculates information related to the conditions surrounding the vehicle (information outside the vehicle), and checks whether a display by the visible laser beam is necessary. If it is determined that the display is necessary, the ECU 14 specifies the object to which the laser beam is to be projected, and sends, to the laser beam ECU 11, a visible laser beam projection instruction signal inclusive of information of a specified object to which the visible laser beam is to be projected. The visible laser beam projection instruction signal includes information of conditions inside and outside of the vehicle, which is a cause for producing the visible laser beam projection instruction signal. Described below is a relationship between a case when the visible laser beam projection instruction signal must be transmitted and an object to which the visible laser beam is to be projected in that case.

That is, when, for example, an obstacle alarm device (e.g., clearance sonar, not shown) has detected an obstacle around the vehicle and displays it, the ECU 14 produces a visible laser beam projection instruction signal to project the visible laser beam onto a portion on the upper surface 7a of the instrument panel 7 close to the obstacle. Further, if a rear imaging system (not shown) takes an image of the rear of the vehicle and displays it to the passenger (i.e., rear view display), the ECU 14 produces a visible laser beam projection instruction signal to project the visible laser beam onto the image display that makes the above such display.

Based on the above signals from the ECUs 12, 14 and 16, the laser beam ECU 11 controls the turn on/off of visible laser beams of the laser projectors 3 and 4, and the directions of projection. The laser beam ECU 11 includes a RAM, a ROM and a CPU, and may realize the operation that will be described later as the CPU executes a program stored in the ROM, or may have a dedicated circuit configuration for realizing the operation that will be described later.

The laser beam ECU 11 stores a direction-position correspondence table 11b. The direction-position correspondence table 11b has a plurality of records corresponding to various portions (start point candidates and target point candidates) in the vehicle, while the records include (1) identifiers of object portions, (2) direction in which the laser projector 3 should be directed to project the visible laser beam to the object portion, and (3) direction in which the laser projector 4 should be directed to project the visible laser beam to the object portion. Here, the identifier of the object portion may be the name of the object portion (e.g., speed indicator of the meter, fuel amount indicator of the meter, door open warning lamp of the meter, center of the right center pillar, center of the right front pillar), or may be a three-dimensional coordinate of the object portion in the vehicle, or may be a combination of the name and the coordinate (e.g., two-dimensional coordinate on the upper surface of the instrument panel).

If there is a portion to which the visible laser beam can be projected from either the laser projector 3 or the laser projector 4, the record of this portion may not include the data of projection direction from the laser projector that is not capable of projecting the visible laser beam onto that portion.

The direction-position correspondence table 11*b* may be stored in the laser beam ECU 11 in advance at the time when the visible laser beam projection system is installed on the vehicle or when the visible laser beam projection system is being produced.

Figure 3:
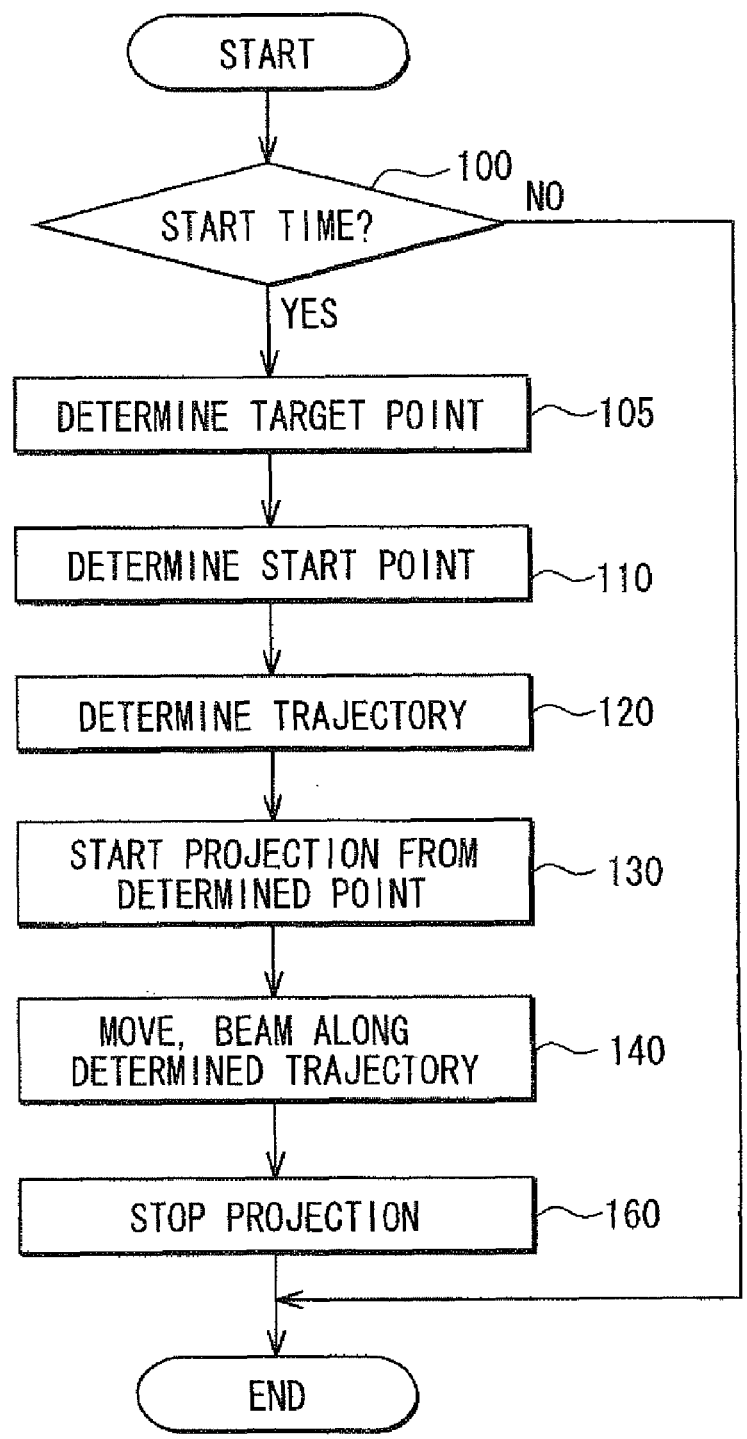
FIG. 3 is a flowchart showing processing executed by a laser beam ECU in the first embodiment.

The laser beam ECU 11 is programmed to repetitively execute processing shown in FIG. 3. Each time this processing is executed, it is checked whether it is a start time point for starting the projection of the visible laser beam (step 100), the laser beam ECU 11 determines a target point of the position to which the visible laser beam is to be projected (step 105), determines a start point (step 110) and determines a path or trajectory (step 120), and starts projecting the visible laser beam from the start point that is determined (step 130), moves the visible laser beam while it is being projected along the trajectory that is determined (step 140) and, thereafter, stops the projection of the visible laser beam (step 160).

The laser projector used for the projection may be the laser projector 3 only, the laser projector 4 only, or may be both of them. Further, the visible laser beam may be projected up to a particular portion on the trajectory by using the laser projector 3 only and may be projected onto the rest of the portion by using the laser projector 4 only. Hereinafter, the laser projector used for projecting the visible laser beam is referred to as the selected laser projector.

At step 100, whether it is the time for starting the projection of the visible laser beam may be checked depending upon whether the visible laser beam projection instruction signal is received from any one of ECU 12, 14 or 16. the target point at step 105 is an object to which the visible laser beam is to be projected included in the visible laser beam projection instruction signal.

The start point at step 110 is determined based on the data of conditions inside and outside of the vehicle serving as a cause for producing the visible laser beam projection instruction signal and included in the received visible laser beam projection instruction signal. Specifically, a plurality of conditions inside and outside of the vehicle are divided into a plurality of groups depending upon the degree of urgency, and the start point is assigned to each of the groups. Then, the start point assigned to the group belonging to the conditions inside and outside of the vehicle received this time is determined as the start point of this time.

The division into groups may be made as shown in FIG. 4. In this example, a particular point on the upper surface 7*a* of the instrument panel 7 is assigned as a start point to the group of a higher degree of urgency of the two groups, and a particular point on the right center pillar 91 or on the right front pillar 92 that is less discernible is assigned as a start point of the group of a lower degree of urgency. If the projection onto the instrument panel 7 is less discernible due to the color or reflection factor of the instrument panel 7, the starting points may be grouped in an opposite manner. In a state (ordinary driving state) where the driver of the vehicle is viewing forward being seated on a driver seat, a particular point on the right front pillar 92 may be assigned as a start point to the group of the higher degree of urgency giving priority to that the right front pillar 92 can be easily recognized by the driver, and a particular point on the upper surface 7*a* of the instrument panel 7 may be assigned as a starting point to the group of the lower degree of urgency.

In the Example of FIG. 4, further, the group of the higher degree of urgency include display of warning of the meter, indication of the meter and detection of dozing, while the group of the lower degree of urgency include display of route guidance, display of clearance sonar, display of rear view, reception of telephone call, charging of ETC bill, and necessity of maintenance.

The trajectory at step 120 is determined based on the data of the conditions inside and outside of the vehicle serving as a cause for producing the visible laser beam projection instruction signal and is included in the visible laser beam projection instruction signal. Specifically, a plurality of conditions inside and outside of the vehicle is divided into a plurality of groups depending upon the actions required for the driver, and the trajectory is assigned to each of the groups. Then, a trajectory assigned to the group belonging to the conditions inside and outside of the vehicle received this time is determined as the trajectory of this time.

Figures 5, 6:
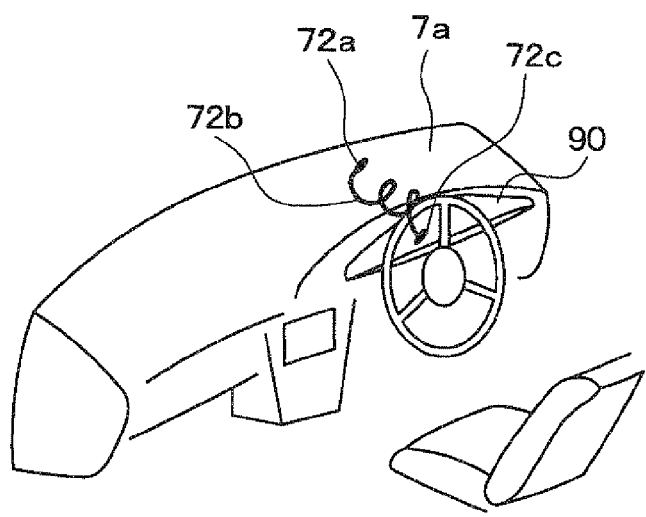
FIG. 5 is a table showing a correspondence between conditions inside/outside of a vehicle serving as a cause for projecting a visible laser beam and trajectories of projection in the first embodiment.
FIG. 6 is a schematic view showing a spiral trajectory in the first embodiment.

The trajectory may be divided into groups as shown in FIG. 5. In this example, a plurality of conditions inside and outside of the vehicle are divided into three groups corresponding to the action for simply watching the display, action for operating a switch and action for operating the steering wheel, accelerator pedal and brake pedal, as actions required for the driver. A spiral trajectory leading to the target point is assigned to the group of the action which is simply for watching the display, a rotary trajectory that rotates around the target point is assigned to the group of the action for operating the switch, and a linear (or curved) reciprocal motion between the start point and the target point is assigned to the group of the action for operating the steering wheel, accelerator pedal and brake pedal.

In the example of FIG. 5, further, the group of the action for simply viewing the display includes the display of warning of the meter, indication of the meter, charging of the ETC bill and the necessity of maintenance, the group of the action for operating the switch includes the reception of telephone call, and the group of the action for operating the steering wheel, accelerator pedal and brake pedal includes the display of route guidance, display of clearance sonar, display of rear view and detection of dozing.

At step 130, further, the laser beam ECU 11 determines the direction of the selected laser projector corresponding to the determined start point based on the direction-position correspondence table 11*b*, moves the projection direction of the selected laser projector in the above direction and then turns on the projection by the selected laser projector.

At step 140, further, the laser beam ECU 11 determines the direction of the selected laser projector corresponding to the determined target point based on the direction-position correspondence table 11*b*, calculates a change in the direction of the selected laser projector corresponding to the trajectory determined at step 120 based on the direction of the above start point and the direction of the target point that is determined, and controls the projection direction of the selected laser projector based on the calculated result with the selected laser projector being maintained turned on. A storage medium in the laser beam ECU 11 may store in advance the data related to the formula for specifically finding the projection direction of spiral, rotary and reciprocal trajectories from the projection direction of the start point and from the projection direction of the target point.

A spiral trajectory 72b is shown in FIG. 6, in which the projection point starts from a point 72a on the upper surface 7a of the instrument panel and ends at a point 72c in the meter 90.

The position to which the visible laser beam is to be projected starts moving from the common start point even when different target points are set depending upon the content (first condition and second condition) of the condition inside the vehicle or the surrounding environment outside the vehicle by being controlled by the laser beam ECU 11. In the example of FIG. 4, for example, if the conditions inside and outside of the vehicle serving as a cause for projecting the visible laser beam belong to the group of a high degree of urgency, the start point becomes a particular point on the upper surface 7a of the instrument panel at all times irrespective of the cause (irrespective of the first condition or the second condition). Therefore, the driver finds it relatively easy to know where he should give attention to recognize the start of projection of the visible laser beam.

Based on the data of the condition in the vehicle or the external environment, further, the laser beam ECU 11 selects the start point out of a plurality of start point candidates in the compartment 1, and controls the turn on/off of projection of the selected laser projector and the direction of projection, so that the position projected by the laser projector moves starting from the selected start point.

As described above, the start point of the visible laser beam projection changes depending upon the data of the condition in the vehicle or the external environment. Therefore, passengers such as a driver is enabled to recognize to some extent the content of the data, that is, whether the data is urgent (high priority) or not (low priority) in the example of FIG. 4 depending upon the position of the start point.

Under some conditions, the laser beam ECU 11 selects one trajectory of motion of the visible laser beam (first moving trajectory) from the spiral, rotary and reciprocal trajectories, and controls the turn on/off of projection of the selected laser projector and the direction of production so that the position projected by the laser projector traces the selected trajectory of motion. Under other conditions, the laser beam ECU 11 selects a different trajectory of motion of the visible laser beam (second moving trajectory) from the spiral, rotary and reciprocal trajectories, and controls the turn on/off of projection of the selected laser projector and the direction of projection so that the position projected by the laser projector traces the selected trajectory of motion.

As described above, the trajectory of position to which the visible laser beam is projected changes depending upon the conditions inside and outside of the vehicle, for instance, depending upon the action required for the driver in the example of FIG. 5. Therefore, the passenger is enabled to recognize to some extent the present condition inside and outside of the vehicle (e.g., what action is required for the passenger) based on the trajectory of the projected position.

Second Embodiment

A second embodiment of a laser beam projection system shown in FIGS. 7 and 8 is different from the first embodiment with respect to the method of selecting the trajectory at step 120 in FIG. 3. Specifically, the laser beam ECU 11 at step 120 checks whether a body moving around the vehicle is a person or a two-wheeled vehicle, specifies the direction in which the body moves, and determines a trajectory as shown in FIG. 7.

As shown in FIG. 8, therefore, the visible laser beam projection system includes a single or a plurality of external camera 18 for repetitively taking images of a plurality of positions around the vehicle in addition to the configuration of the first embodiment. The visible laser beam projection system, further, includes an ECU 13, which detects the presence of the two-wheeled vehicle or man and detects the direction in which the two-wheeled vehicle or man moves based upon the images repetitively taken by the camera 18 by utilizing a known image recognition technology. When the person or two-wheeled vehicle is detected around the vehicle, the ECU 13 produces a detection signal including data representing if the detected body is the two-wheeled vehicle or man and data representing the direction in which the body is moving relative to the vehicle.

Figure 9:
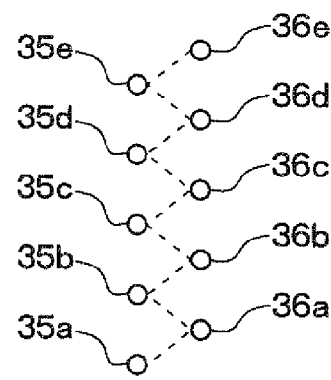
FIG. 9 is a diagram showing trajectories of light spots when a person is detected around the vehicle in the second embodiment.

Selection of the trajectory will now be described in detail with reference to FIG. 7. First, if the detection signal from the ECU 13 includes data representing that the moving body is a person, a trajectory along which the two light spots are alternately projected on the upper surface 7a of the instrument panel 7 is employed as the trajectory of positions to which the visible laser beam is projected. FIG. 9 shows a group of light spots 35a to 35e, and 36a to 36e as an example of trajectory. In the example shown, the trajectory that is employed is a discrete trajectory moving in order of spot 35a, spot 36a, spot 35b, spot 36b, spot 35c, spot 36c, spot 35d, spot 36d, spot 35e, spot 36e. The above trajectory is a discretely moving trajectory proceeding in a zig-zag manner over vertexes 35a to 35e and 36a to 36e extending upward in a zig-zag shape as represented by a dotted line.

Figure 10:
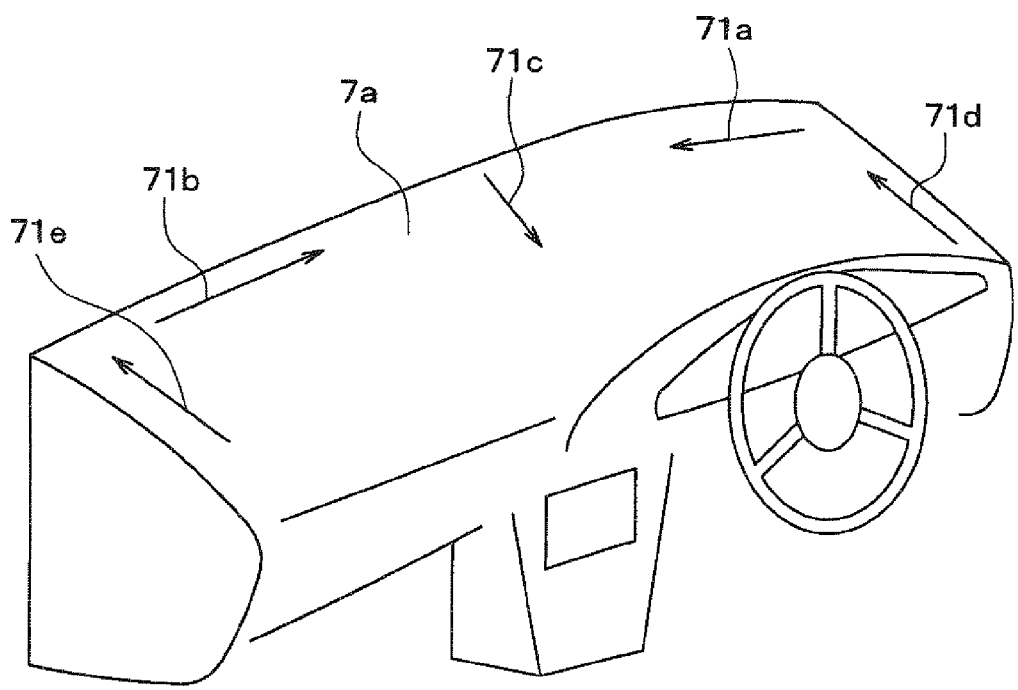
FIG. 10 is a schematic view showing trajectories of positions to which the visible laser beam is projected in the second embodiment.

The direction in which the trajectory extends is a direction along (i.e., in parallel with) the direction of motion included in the detection signal. FIG. 10 shows examples 71a to 71e of direction in which the trajectory extends on the upper surface 7a of the instrument panel 7. A trajectory 71a indicates a trajectory provided when the detected person is moving from the right to the left in front of the vehicle. A trajectory 71b indicates a trajectory provided when the detected person is moving from the left to the right in front of the vehicle. A trajectory 71c indicates a trajectory provided when the detected man is approaching the vehicle from the front of the vehicle. A trajectory 71d indicates a trajectory provided when the detected person is approaching the vehicle from the right rear side of the vehicle. A trajectory 71e indicates a trajectory provided when the detected person is approaching the vehicle from the left rear side of the vehicle.

Further, if the detection signal from the ECU 13 includes data representing that the moving body is the two-wheeled vehicle, the laser beam ECU 11 so operates that the visible laser beams projected onto the projection positions from the selected laser projectors assume the shape of two circles or arcs. A technology for making the shape of projection by the selected laser projector more complex than a simple light spot will be the technology using a known device for drawing an optical region, such as a known MEMS (micro-electromechanical system) resonance mirror or a DMD (digital micromirror device). A device using the MEMS resonance mirror will be, for example, the ECOSCAN (registered trademark) of Nihon Shingo Co. Further, a device using the digital micromirror device will be, for example, a digital projector of the DLP (registered trademark) system of Texas Instruments Co., U.S.A.

Figure 11:
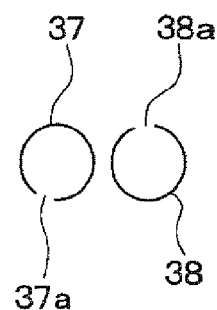
FIG. 11 is a schematic diagram showing shapes of visible laser beams projected onto projection positions when a person is detected around the vehicle in the second embodiment.

FIG. 11 shows two arcuate shapes 37 and 38. In moving the arcuate shapes 37 and 38 along the trajectory of positions to which the visible laser beam is projected, cut-away portions 37a and 38a of the arcs 37 and 38 may be rotated about the centers of the arcs 37 and 38. This enables the passenger to easily comprehend that the arcs are simulating the rotating wheels.

The relationship between the moving trajectories of two circles or arcs and the direction of motion of the two-wheeled vehicle is the same as the one described with reference to FIG. 10. That is, the moving trajectories of circles or arcs become the trajectory 71*a* if the detected two-wheeled vehicle is moving from the right toward the left in front of the vehicle. It becomes the trajectory 71*b* if the detected two-wheeled vehicle is moving from the left toward the right in front of the vehicle. It becomes the trajectory 71*c* if the detected two-wheeled vehicle is approaching the vehicle from the front of the vehicle. It becomes the trajectory 71*d* if the detected two-wheeled vehicle is approaching the vehicle from the right rear side of the vehicle. It becomes the trajectory 71*e* if the detected two-wheeled vehicle is approaching the vehicle from the left rear side of the vehicle.

Thus, the visible laser beam that moves along the direction in which the detected body moves outside the vehicle gives to the passenger a strong impression of the direction in which the body is moving outside the vehicle.

Based on that the body detected by the ECU 13 is the person, the laser beam ECU 11 selects a trajectory of motion that proceeds in a zig-zag manner over the vertexes extending in a zig-zag manner in a direction in which the body moves, and controls the turn on/off of projection by the selected laser projector and the direction of projection, so that the projection position projected by the selected laser projector traces the trajectory of motion that is selected.

Thus, the projection position of the visible laser beam that traces the trajectory simulating a walking person gives to the passenger a strong impression of the body which is the person outside the vehicle.

Further, based on that the body detected by the ECU 13 is the two-wheeled vehicle, the laser beam ECU 11 controls the turn on/off of projection by the selected laser projector and the direction of projection, so that the projection position projected by the selected laser projector traces the trajectory of motion that is selected. The laser beam ECU 11, further, controls the laser projector, so that the shapes of the visible laser beams projected onto the projection positions from the laser projectors become two circles or arcs.

Thus, the circles or arcs simulating the wheels of the two-wheeled vehicle that trace the selected trajectory give to the passenger a strong impression of the body which is the two-wheeled vehicle outside the vehicle.

Here, the motion of the visible laser beam may be varied as described below. That is, the visible laser beam is so projected as having a waveform of a predetermined frequency, the waveform being projected having a relatively low frequency when the body is present away from the vehicle under a condition where the body outside the vehicle is approaching the vehicle, and the waveform having a frequency that increases as the body outside the vehicle approaches the vehicle. The projection may be continuously varied from a low frequency toward a high frequency, or a plurality of frequencies provided in advance may be changed over successively.

Upon recognizing the waveforms, therefore, the driver of the vehicle is enabled to recognize that the body outside the vehicle is away from the vehicle if the frequency is relatively low, and that the body outside the vehicle is near the vehicle if the frequency is relatively high and, further, enabling the driver to easily recognize the body outside the vehicle that is approaching the vehicle depending upon a change in the waveform.

Third Embodiment

A third embodiment is different from the first embodiment in that the laser beam ECU 11 repetitively executes the processing shown in FIG. 12 instead of executing the processing shown in FIG. 3. The processing of steps 100, 105, 110, 120, 130 and 160 in FIG. 12 are the same as the processing in FIG. 3 described in the first embodiment.

In the processing of FIG. 12, if it is determined that the time point is for starting the projection of the visible laser beam (step 100), the laser beam ECU 11 determines a target point of the position to which the visible laser beam is to be projected (step 105), determines a start point (step 110), determines a trajectory (step 120) and determines a display mode (step 125), and starts projecting the visible laser beam from the start point that is determined (step 130), moves the visible laser beam while it is being projected along the trajectory that is determined and in the display mode that is determined (step 140), and stop the projection of the visible laser beam (step 160).

In this embodiment, the display mode at step 125 is a mode of change of brightness at the projection position to which the visible laser beam is projected. To control the change in the brightness, the laser beam ECU 11 controls the intensity of the visible laser beams projected by the laser projector 3 and the laser projector 4.

At step 125, more specifically, the mode of changing the brightness is determined based on the data of conditions inside and outside of the vehicle serving as a cause for producing the visible laser beam projection instruction signal, which is included in the visible laser beam projection instruction signal. Specifically, a plurality of conditions inside and outside of the vehicle are divided into a plurality of groups in advance depending upon the degree of urgency (first condition and second condition), and the mode of changing the brightness is assigned to each of the groups like determining the start point in the first embodiment. Then, the mode of changing the brightness assigned to the group belonging to the conditions inside and outside of the vehicle received this time is determined as the mode of changing the brightness of this time.

The division into groups may be made as shown in FIG. 4. The group having a higher degree of urgency may include display of warning of the meter, indication of the meter and detection of dozing while the group of the lower degree of urgency may include display of route guidance, display of clearance sonar, display of rear view, reception of telephone call, charging of ETC bill, and necessity of maintenance.

Here, further, a mode in which the brightness alternately changes between zero and non-zero, i.e., a flashing mode may be assigned to the group of the higher degree of urgency, and a mode in which the brightness is maintained constant may be assigned to the group of the lower degree of urgency. Alternatively, a mode in which the brightness alternately changes between a first non-zero value and a second non-zero value (different from the first non-zero value), i.e., a blinking mode may be assigned to the group of the higher degree of urgency, and a mode in which the brightness is maintained constant may be assigned to the group of the lower degree of urgency.

At step 140, the selected laser projector is so controlled as to realize the mode of changing the brightness determined at step 125 while moving the projection position projected by the selected laser projector along the trajectory that is determined.

Under some conditions as described above, the controller selects one mode of changing the brightness, and controls the intensity of projection by the laser projector so that the position in the compartment is projected in the selected mode of changing the brightness. Under other conditions, the controller selects another mode of changing the brightness different from the above mode of changing the brightness, and controls the intensity of projection by the laser projector so that the position in the compartment is projected in the another selected mode of changing the brightness.

As described above, the brightness of projection (flashing, blinking in the above example) of the visible laser beam changes depending upon the conditions. Therefore, the passenger is allowed to recognize to some extent the present condition depending upon the change in the brightness.

Fourth Embodiment

A fourth embodiment is different from the third embodiment in that the display mode at step 125 in the processing of FIG. 12 executed by the laser beam ECU 11 is a color mode at the projection position to which the visible laser beam is projected.

To control the projected color, the laser projector 3 and the laser projector 4 of this embodiment may change the color of the visible laser beams that are projected. In this case, each laser projector may have, for example, three light generators capable of generating visible laser beams of red, green and blue colors, respectively, and distributes the amounts of the visible laser beams of these colors that are projected based on the color control by the laser beam ECU 11.

At step 125, the laser beam ECU 11 determines the color based on the data of conditions inside and outside of the vehicle serving as a cause for producing the visible laser beam projection instruction signal, which is included in the visible laser beam projection instruction signal. Specifically, a plurality of conditions inside and outside of the vehicle are divided into a plurality of groups in advance depending upon the degree of urgency of the conditions and upon whether the object to which the data is to be informed is a passenger on a front passenger seat next to a driver seat (first condition and second condition), and a different color of projection is assigned to each of the groups like determining the start point in the first embodiment. Then, a color assigned to the group belonging to the conditions inside and outside of the vehicle received this time is determined as the color of this time.

The division into groups may be made as shown in FIG. 4. The group having a higher degree of urgency may include display of warning of the meter, indication of the meter and detection of dozing, while the group of the lower degree of urgency may include display of route guidance, display of clearance sonar, display of rear view, reception of telephone call, charging of ETC bill, and necessity of maintenance. Further, the reception of call by the cell phone on the side of the assistant driver seat may be assigned to the group in which the object to which the data is to be informed is a passenger on the front passenger seat. Here, the visible laser beam projection system may detect the call received by the cell phone on the side of the front passenger seat through a radio communication with the cell phone (e.g., radio communication using Bluetooth).

Here, further, the red color may be assigned to the group of the higher degree of urgency, a green color may be assigned to the group of the lower degree of urgency, and the green color may be assigned to the group in which the object to which the data is to be informed is a passenger on the front passenger seat.

Another exemplary method of determining the color may be a division of a plurality of conditions inside and outside of the vehicle into a plurality of groups depending upon the person who is to be informed of the conditions (first condition and second condition) in advance, and assigning the color to each of the groups. In this case, too, a color assigned to the group that belongs to the conditions inside and outside of the vehicle received this time is determined as the color of this time.

In this case, the groups of persons to be informed of can be divided by a first method of division into a group of information to be informed to the driver and a group of information to be informed to persons other than the driver, and a second method of division into a plurality of groups, i.e., a group of information to be informed to a father, a group of information to be informed to a mother, and a group of information to be informed to children.

When the first method is employed, information which directly affects the traveling of vehicle (e.g., display of warning of the meter, display of route guidance of a navigation device) may belong to the group of information to be informed to the driver, and information that does not directly affect the traveling of the vehicle (e.g., display of air conditioner, display of TV) may belong to the group of information to be informed to persons other than the driver.

When the second method is employed and when the visible laser beam projection system has a TV receiver with a known program reservation reception function, anyone of the father; mother or child who has conducted the input operation in an attempt to reserve the program, may also be registered to the TV receiver, and the laser beam ECU 11 that has received the data for registration from the TV receiver may include the display of the reserved TV program in the group of the person who was registered together with the program reservation.

At step 140, the selected laser projector is so controlled as to realize the projection color determined at step 125 while moving the projection position projected by the selected laser projector along the trajectory that is determined.

Under some conditions as described above, the laser beam ECU 11 selects a projection color, and controls the projection color of the selected laser projector so that the position in the compartment is projected with the selected projection color.

Under other conditions, the laser beam ECU 11 selects another projection color different from the above projection, and controls projection color of the selected laser projector so that the position in the compartment is projected with the selected another projection color.

As described above, the projection color of the visible laser beam changes depending upon the conditions. Therefore, the passenger is allowed to recognize to some extent the present condition depending upon the projection color.

Fifth Embodiment

A fifth embodiment is different from the third embodiment in that the display mode at step 125 in the processing of FIG. 12 executed by the laser beam ECU 11 is a sound output mode linked to the projection of the visible laser beam.

At step 125, therefore, the laser beam ECU 11 determines the sound output mode based on the data of conditions inside and outside of the vehicle serving as a cause for producing the visible laser beam projection instruction signal, which is included in the visible laser beam projection instruction signal. Specifically, a plurality of conditions inside and outside of the vehicle are divided into a plurality of groups in advance depending upon the degree of urgency of the conditions (first condition and second condition), and a sound output mode is assigned to each of the groups like determining the start point in the first embodiment. Then, a sound output mode assigned to the group belonging to the conditions inside and outside of the vehicle received this time is determined as the sound output mode of this time.

The division into groups may be made as shown in FIG. 4. The group having a higher degree of urgency may include display of warning of the meter, indication of the meter and detection of dozing, while the group of the lower degree of urgency may include display of route guidance, display of clearance sonar, display of rear view, reception of telephone call, charging of ETC bill, and necessity of maintenance.

Here, further, such a sound output mode may be assigned to the group of the higher degree of urgency as to repetitively produce a whistling sound like pip, pip, - - - while the projection position is moving, and such a sound output mode may be assigned to the group of the lower degree of urgency as to produce single whistling sound like pip only when the projection position starts moving.

At step 140, the sound signal is output to the speaker 8 to realize the sound output mode determined at step 125, while moving the visible laser beam along the trajectory determining the projection positions to be projected by the selected laser projector.

Under some conditions as described above, the laser beam ECU 11 selects a kind of sound, causes the selected laser projector to project a visible laser beam onto a position in the compartment 1, and causes the speaker 8 which is a sound output device to produce a sound corresponding to the kind of sound that is selected. Under other conditions, the laser beam ECU 11 selects another kind of sound different from the above kind of sound, causes the selected laser projector to project a visible laser beam onto a position in the compartment 1, and causes the speaker 8 to produce a sound corresponding to the another kind of sound that is selected.

As described above, the sound produced together with the projection of the visible laser beam changes depending upon the conditions. Therefore, the passenger is enabled to recognize to some extent the present condition depending upon the sound that is produced Sixth Embodiment A sixth embodiment is different from the third embodiment in that the display mode at step 125 in the processing of FIG. 12 executed by the laser beam ECU 11 is a mode of moving speed of the projection position to which the visible laser beam is projected.

At step 125, therefore, the laser beam ECU 11 determines the moving speed of the projection position based on the data of conditions inside and outside of the vehicle serving as a cause for producing the visible laser beam projection instruction signal, which is included in the visible laser beam projection instruction signal. Specifically, a plurality of conditions inside and outside of the vehicle are divided into a plurality of groups in advance depending upon the degree of urgency of the conditions (first condition and second condition), and a moving speed is assigned to each of the groups like determining the start point in the first embodiment. Then, a moving speed assigned to the group belonging to the conditions inside and outside of the vehicle received this time is determined as the moving speed of this time.

The division into groups may be made as shown in FIG. 4. The group having a higher degree of urgency may include display of warning of the meter, indication of the meter and detection of dozing while the group of the lower degree of urgency may include display of route guidance, display of clearance sonar, display of rear view, reception of telephone call, charging of ETC bill, and necessity of maintenance.

Here, further, moving speed A may be assigned to the group of the higher degree of urgency, and a moving speed B lower than the moving speed A may be assigned to the group of the lower degree of urgency.

At step 140, in moving the projection position projected by the selected laser projector along the determined trajectory, the selected laser projector is so controlled as to move the projection position on the trajectory at the moving speed determined at step 125. Here, to realize the determined moving speed, the laser beam ECU 11 may store the data of various bodies in the compartment 1 and of the three-dimensional position of the laser beam ECU 11 itself, may derive a relationship between the angle by which the projection direction is deviated from the direction in which the visible laser beam is being projected and the distance of motion of the projection position based on the stored data, and may adjust the rate of change in the angle of the projection direction of the selected laser projector based on the derived relationship.

Under some conditions, the laser beam ECU 11 selects a moving speed, and controls the moving speed of the selected laser projector so that the position in the compartment is projected at the selected moving speed. Under other conditions, the laser beam ECU 11 selects another moving speed different from the above moving speed, and controls projection direction of the selected laser projector so that the projection position moves in the compartment at the another selected speed.

As described above, the moving speed of the visible laser beam changes depending upon the conditions. Therefore, the passenger is allowed to recognize to some extent the present condition depending upon the moving speed.

Seventh Embodiment

A seventh embodiment is different from the third embodiment in that the display mode at step 125 in the processing of FIG. 12 executed by the laser beam ECU 11 is a mode of diffusion rate (factor) of the flux of the projected visible laser beam. Here, the diffusion rate of the flux of light is a ratio of a sectional area and a distance when the flux of light is cut on a spherical surface which is away by a given distance from a point from where the flux of light is emitted.

At step 125, therefore, the laser beam ECU 11 determines the diffusion rate of the flux of the visible laser beam depending upon the degree of motion of the projection position on the trajectory (i.e., degree of movement). Referring, for example, to FIG. 13, the position to which the visible laser beam is projected is divided into three sections along a trajectory from the start point to the target (end) point. Here, the diffusion rate is selected to be great if the projection position is in the first section among the three sections, i.e., in a section of up to one-third the trajectory from the start point (first condition and second condition). The diffusion rate is selected to be medium if the projection position is in the intermediate section, i.e., in a section from one-third to two-thirds the trajectory (first condition and the second condition), and the diffusion rate is selected to be small if the projection position is in the final section, i.e., in the section from two-thirds to the target point of the trajectory (first condition and second condition).

At step 140, in moving the projection position projected by the selected laser projector along the determined trajectory, the selected laser projector is so controlled as to change the diffusion rate of the flux of light as determined at step 125.

Figure 14:
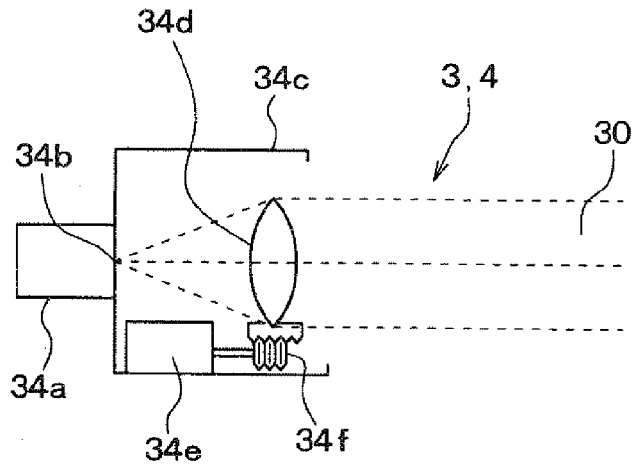
FIG. 14 is a schematic view of a mechanism of laser beam projectors according to a seventh embodiment, and for controlling a position of a laser beam projector.
Figure 15:
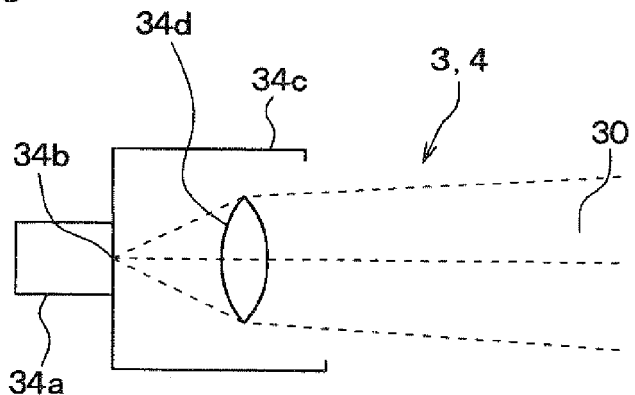
FIG. 15 is a schematic view of the mechanism of the laser beam projectors according to the seventh embodiment, and for controlling the position of the laser beam projector.
Figure 16:
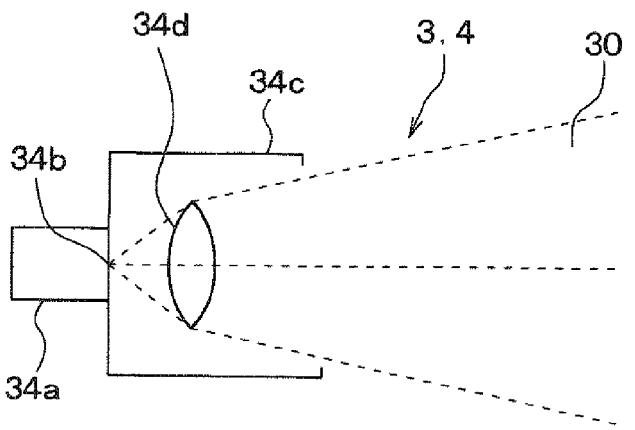
FIG. 16 is a schematic view of the mechanism of the laser beam projectors according to the seventh embodiment, and for controlling the position of the laser beam projector.

In order to control the diffusion rate, the laser projector 3 or the laser projector 4 may have a structure as shown in FIGS. 14 to 16. In this example, the laser projector has a light-generating portion 34a for generating a visible laser beam and a light-collecting portion 34c.

The visible laser beam formed by the light-generating portion 34a is projected from a light source 34b into the light-collecting portion 34c. The light-collecting portion 34c includes a lens 34d, a motor 34e and a gear mechanism 34f. The lens 34d refracts the visible laser beam from the light source 34b so that the flux of the visible laser beam is emitted to the exterior of the laser projector. Upon being controlled by the laser beam ECU 11, the motor 34e changes the position of the lens 34d via the gear mechanism 34f such as worm gear to change the distance from the light source 34b to the lens 34d. In FIGS. 15 and 16, the motor 34e and the gear mechanism 34f are not shown.

In FIG. 14, the distance between the light source 34b and the lens 34d is in agreement with the focal distance of the lens 34d and, therefore, the flux of light 30 emitted from the lens 34d becomes a parallel flux of light. In the example of FIG. 13, the laser beam ECU 11 in the final section controls the position of the lens 34d that is controlled as shown in FIG. 14.

In FIG. 15, the distance between the light source 34b and the lens 34d is shorter than that of the case of FIG. 14 and, therefore, the diffusion rate of the flux of light 30 emitted from the lens 34d becomes greater than that of the case of FIG. 14. In the example of FIG. 13, the laser beam ECU 11 in the intermediate section controls the position of the lens 34d that is controlled as shown in FIG. 15.

In FIG. 16, the distance between the light source 34b and the lens 34d is shorter than that of the case of FIG. 15 and, therefore, the diffusion rate of the flux of light 30 emitted from the lens 34d becomes greater than that of the case of FIG. 15. In the example of FIG. 13, the laser beam ECU 11 in the final section controls the position of the lens 34d that is controlled as shown in FIG. 16.

Figures 17, 19:
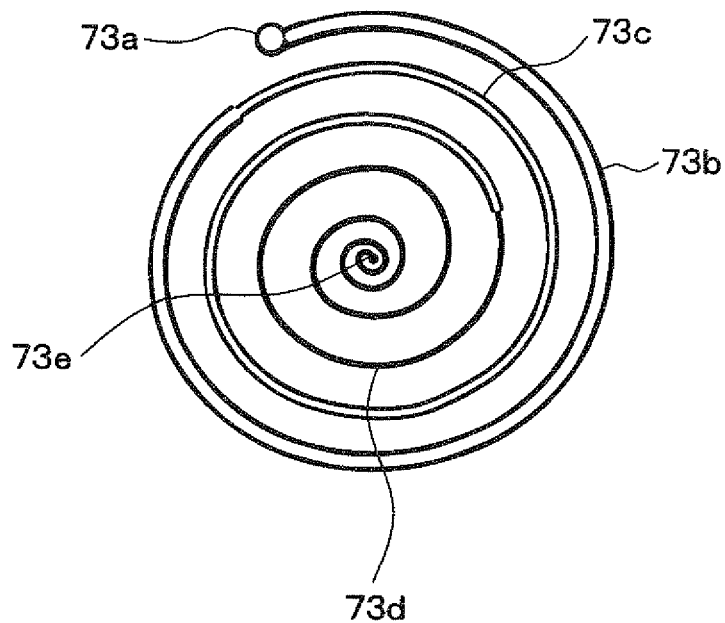
FIG. 17 is a schematic view showing a trajectory of projection of the visible laser beam according to the seventh embodiment and a change in a thickness of a light spot along the trajectory of projection.
FIG. 19 is a table showing data of correspondence between an object to be projected which is a target point and a shape of the object to be projected in the eighth embodiment.

FIG. 17 illustrates a trajectory of projection and a change in the size of the light spot along the trajectory of projection in the compartment 1 as a result of being controlled by the laser beam ECU 11. In FIG. 17, the light spot has the greatest size at the projection position in the initial section 73b starting from the start point 73a, has a decreased size (medium) in the next intermediate section 73c, and has the smallest size in the final section 73d leading to the target point 73e.

As described above, the size of the light spot that is projected becomes small as it approaches the target point, and the passenger feels that the focal point of the visible laser beam is attained as the light spot approaches the target point.

Under some conditions as described above, the laser beam ECU 11 selects a given diffusion rate and so controls the selected laser projector that the diffusion rate of the flux of light projected therefrom assumes the selected diffusion rate. Under other conditions, the laser beam ECU 11 selects another diffusion rate different from the above diffusion rate and so controls the selected laser projector that the diffusion rate of the flux of light projected therefrom assumes the another selected diffusion rate.

As described above, the broadening degree of the visible laser beam projected onto the projection position changes depending upon the conditions as the diffusion rate of the flux of visible laser beam changes depending upon the conditions. Therefore, the passenger is allowed to recognize to some extent the present condition depending upon the broadening degree of the visible laser beam that is projected.

Eighth Embodiment

Figure 18:
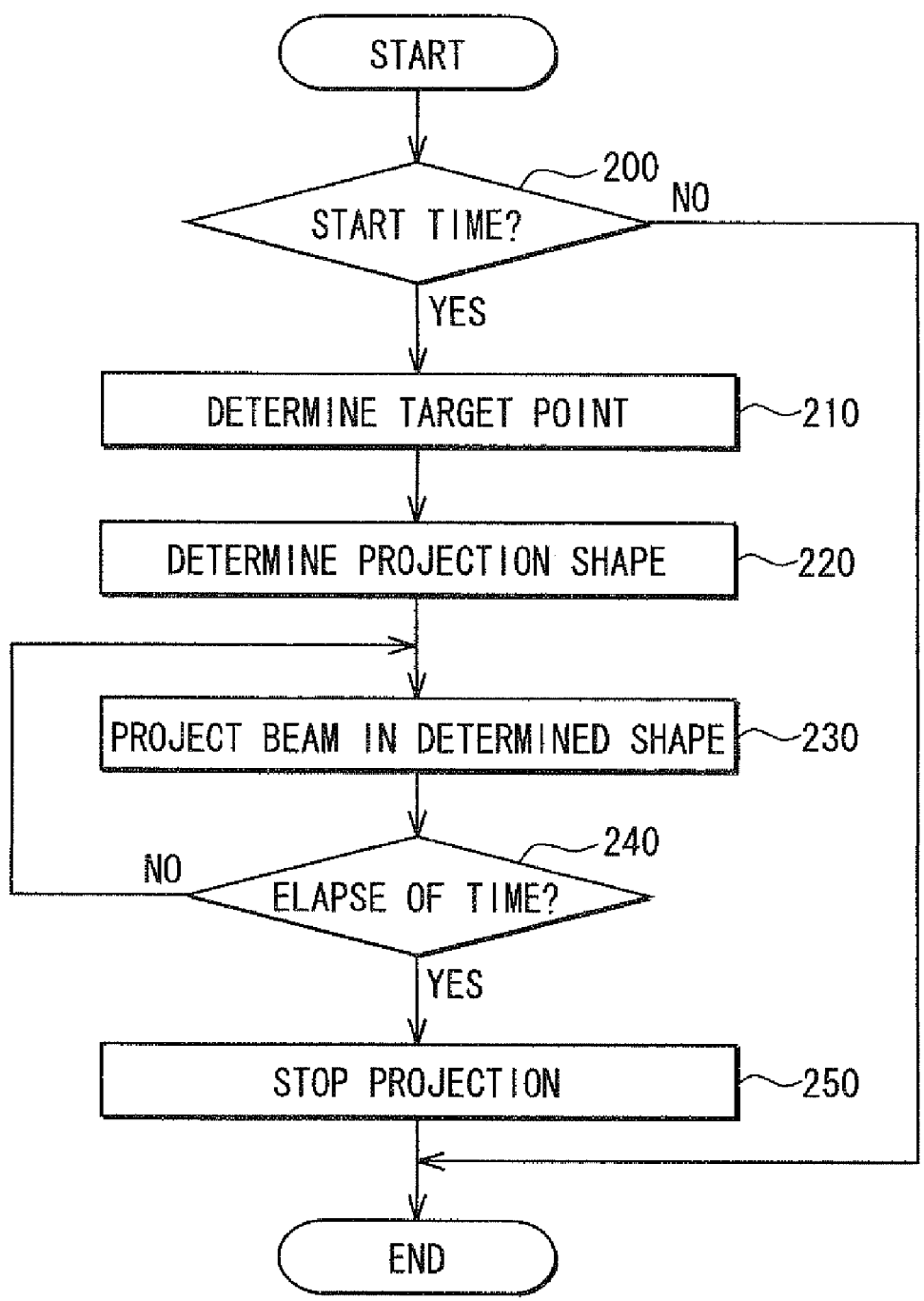
FIG. 18 is a flowchart showing processing executed by a laser beam ECU of a laser beam projection system according to an eighth embodiment of the present invention.

An eighth embodiment is different from the first embodiment in that the laser beam ECU 11 repetitively executes processing shown in FIG. 18 instead of executing the processing shown in FIG. 3. The processing at steps 200, 210 and 250 in FIG. 18 are the same as the processing at steps 100, 105 and 160 in FIG. 3.

In the processing of FIG. 12, if it is determined that the time point is for starting the projection of the visible laser beam (step 200), the laser beam ECU 11 determines a target point of the position to which the visible laser beam is to be projected (step 210) and a shape of projection (step 220), projects the visible laser beam onto the determined target point in the determined shape of projection (step 230) until a predetermined period of time elapses (step 240), and stops the projection of the visible laser beam after the elapse of the predetermined period of time (step 250).

Here, the shape of projection at step 220 is determined based on the target point determined at step 210. Specifically, the shape of projection is set to be the same as the shape of the object to be projected at the target point. For this operation, the laser beam ECU 11 stores the data of correspondence between the object to be projected at the target point and the shape of the object to be projected, and applies the determined target point to the data of correspondence to determine the shape of projection. FIG. 19 illustrates the correspondence represented by the data of correspondence.

At step 230, the selected laser projector is so controlled that the target point is projected in the determined shape of projection. As a technology for making the shape of projection by the selected laser projector to become more complex than a simple light spot, the technology of the second embodiment may be used.

As described above, the laser beam ECU 11 selects the object to be projected, specifies the shape of the object to be projected based on the data of correspondence between the object to be projected and the shape thereof, and so controls the selected laser projector that the visible laser beam is projected in the specified shape onto the position of the object to be projected. Since the shape of the visible laser beam projected onto the projection position is the same as the shape of the object to be projected, the passenger finds it easy to discriminate what is projected with the visible laser beam.

Ninth Embodiment

Figure 20:
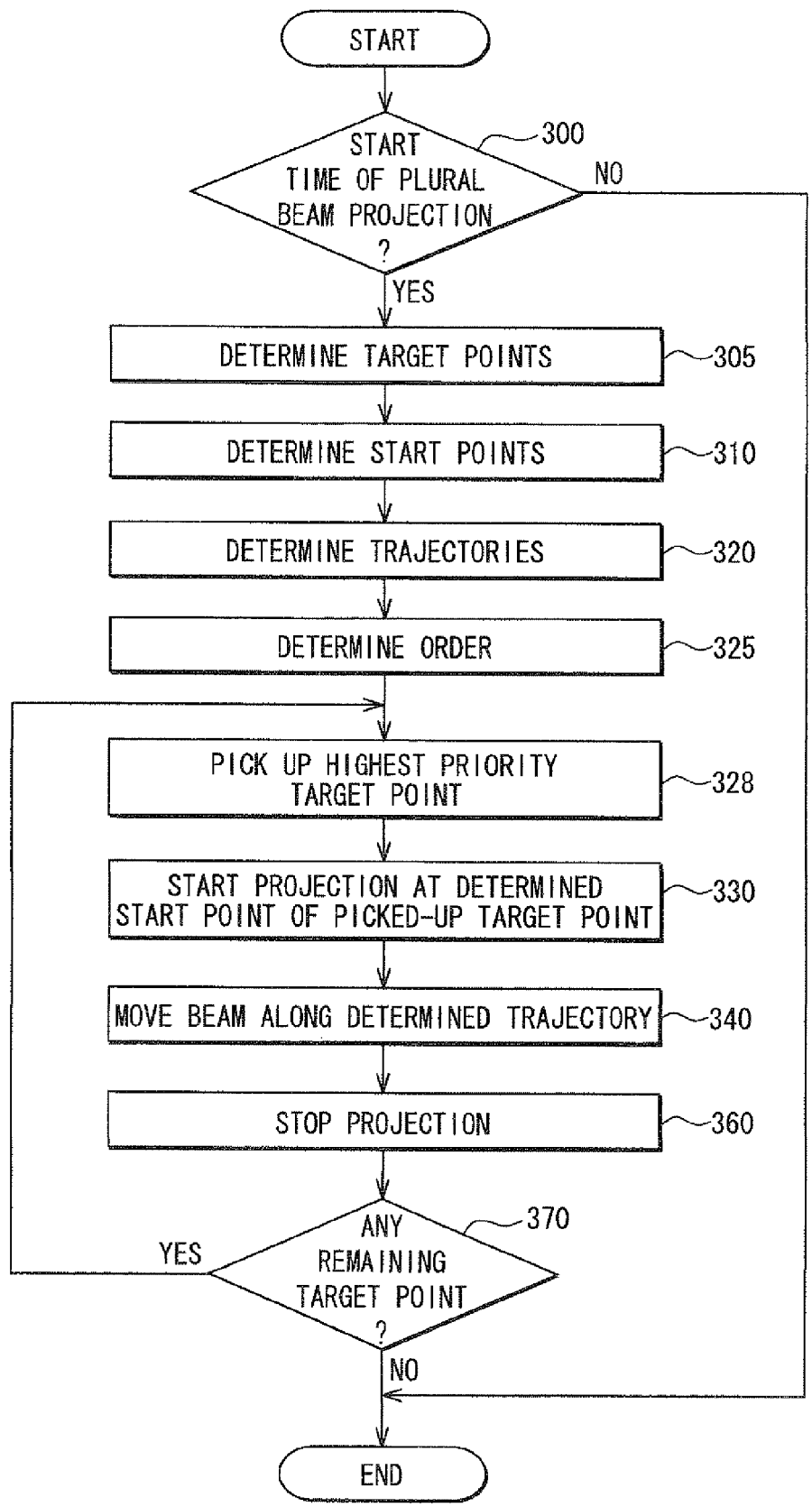
FIG. 20 is a flowchart showing processing executed by a laser beam ECU of a laser beam projection system according to a ninth embodiment of the present invention.

A ninth embodiment is different from the first embodiment in that the laser beam ECU 11 repetitively executes processing shown in FIG. 20 instead of executing the processing shown in FIG. 3.

In the processing of FIG. 20, if it is determined that the time point is for starting the projection of a plurality of kinds of visible laser beams based on the data of the conditions inside and outside of the vehicle (step 300), the laser beam ECU 11 determines target points of the positions to which the plurality of kinds of visible laser beams are to be projected (step 305), start points (step 310) and trajectories (step 320).

Here, at step 300, whether the time point is for starting the projection of the plurality of kinds of visible laser beams is checked depending upon whether a plurality of visible laser beam projection instruction signals are received from the last decision at step 300 to the determination of this time at step 300. The processing contents for the individual visible laser beam projection instruction signals at steps 305, 310 and 320 are the same as the processing at steps 105, 110 and 120 of the first embodiment.

After step 325, the laser beam ECU 11 determines the order of projection among the plurality of target points that are determined (step 325). Specifically, the conditions inside and outside of the vehicle serving as a cause for projecting the target points are divided into a plurality of groups depending upon the degree of urgency of the conditions. Of the two target mints, the one corresponding to the conditions inside and outside of the vehicle of a higher degree of urgency is regarded to be a target point having a higher priority.

The division into groups may be made as shown in FIG. 4. The group having a higher degree of urgency may include display of warning of the meter, indication of the meter and detection of dozing while the group of the lower degree of urgency may include display of route guidance, display of clearance sonar, display of rear view, reception of telephone call, charging of ETC bill, and necessity of maintenance.

After step 320, the laser beam ECU 11 repeats processing for picking up each of the target points in order of decreasing priority of projection that is determined (step 328) until the target points determined this time are all picked up (step 370).

In the repetition of each time, the selected laser projectors project the visible laser beams onto the start points which are determined for the target points that are picked up (step 330), the projection positions where the visible laser beams are to be projected are moved along the trajectories that are determined for the target points that are picked up (step 340), and, thereafter, the visible laser beams are no longer projected onto the target points (step 360). The processing contents of steps 330, 340 and 360 are the same as the processing contents of steps 130, 140 and 160 of FIG. 3.

Even when it is requested to project a plurality of kinds of visible laser beams, therefore, the visible laser beams are projected one by one successively. Therefore, it does not happen that the two remote light spots move simultaneously in the compartment 1. In case a plurality of projections are simultaneously requested for the plurality of laser projectors 3, 4, the laser beam ECU 11 so controls that the plurality of laser projectors will not simultaneously change the projection positions to which the visible laser beams are to be projected. Even in case the plurality of laser projectors 3, 4 are simultaneously requested to project the visible light beams, the plurality of laser projectors that are requested do not simultaneously move the projection positions, and the passenger is prevented from becoming confused.

Tenth Embodiment

Figure 21:
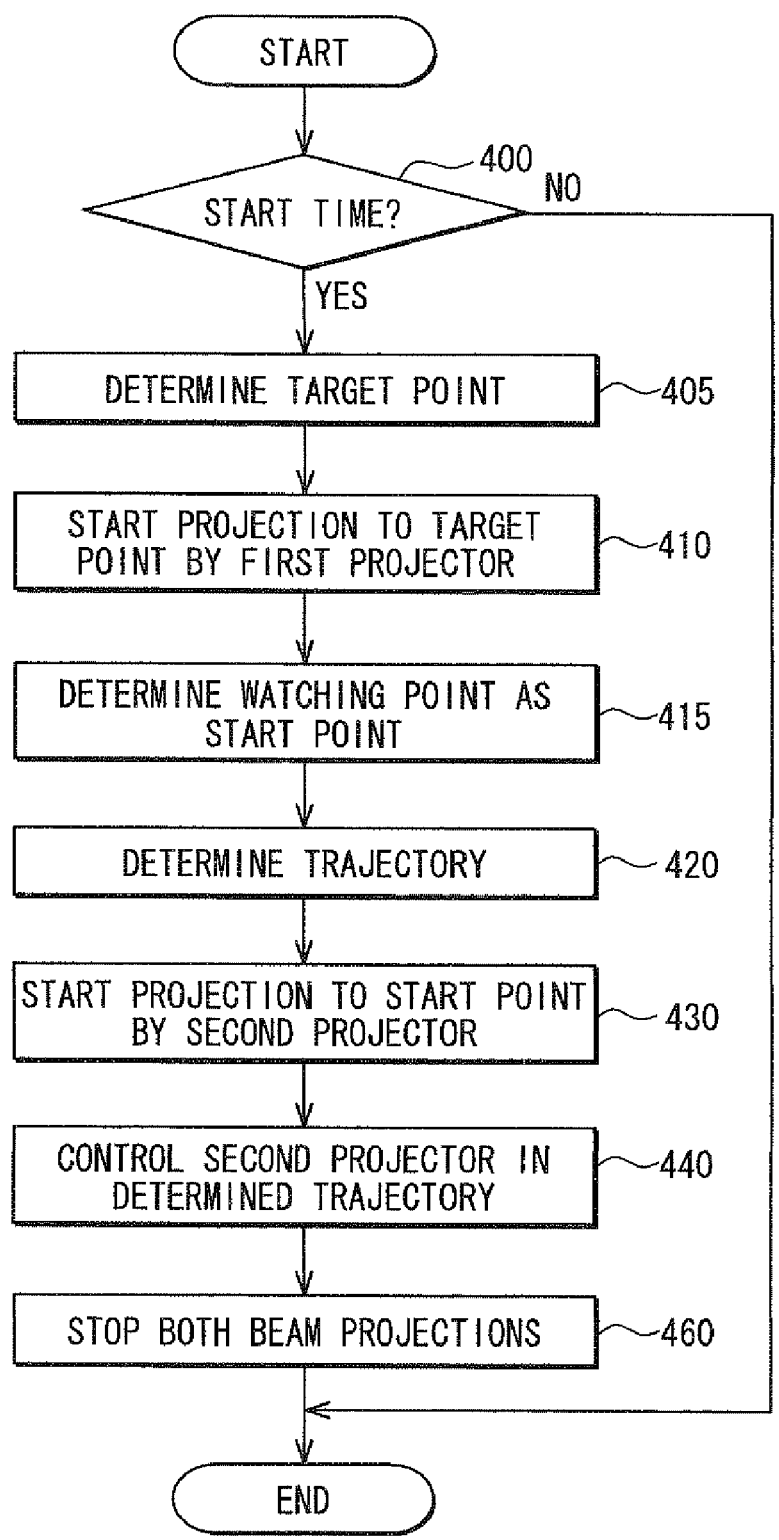
FIG. 21 is a flowchart showing processing executed by a laser beam ECU of a laser beam projection system according to a tenth embodiment of the present invention.

In a tenth embodiment, the laser projector 3 is provided as a first laser projector 3 and the laser projector 4 is provided as a second laser projector 4. This embodiment is different from the first embodiment in that the laser beam ECU 11 repetitively executes processing shown in FIG. 21 instead of executing the processing shown in FIG. 3. In the processing of FIG. 21, the processing at steps 400, 405 and 420 in FIG. 21 are the same as the processing at steps 100, 105 and 120 in FIG. 3.

In the processing in FIG. 21, it is checked whether the time point is for starting the projection of the visible laser beam (step 400), the laser beam ECU 11 determines a target point of the position to which the visible laser beam is to be projected (step 405) and causes the first laser projector 3 to project the visible laser beam onto the target point (step 410). The laser beam ECU 11 further detects the driver's watching point in the compartment 1 and determines the watching point as a start point (step 415). The watching point corresponds to an end point in the watching direction. The laser beam ECU 11, further, determines the trajectory of the projection position (step 420), causes the second laser projector 4 to start projecting the visible laser beam from the start point that is determined (step 430), control the second laser projector 4 to move the position to which the visible laser beam is projected along the trajectory that is determined (step 440), and, thereafter, causes the first laser projector 3 and the second laser projector 4 to no longer project the visible laser beams (step 460).

In order to realize the processing for detecting the driver's watching point at step 415, the ECU 16 uses a known image recognition technology for the image taken by the indoor camera 5, and detects the direction in which the driver 9 is watching and outputs the data of the detected direction of watching (data in the vehicle) to the laser beam ECU 11. The laser beam ECU 11 specifies the position in the compartment 1 at the end of the direction of watching based upon the data representing three-dimensional positions of each of the portions in the compartment, and regards the position as the start point.

Due to the above operation of the laser beam ECU 11, the second laser projector 4 starts projecting the visible laser beam from the point where the passenger is watching, while the first laser projector 3 continues to project the visible laser beam onto the target point, and the projection position is moved along the trajectory that is determined up to the target point.

As described above, the laser beam ECU 11 causes the second laser projector 3 to project the visible laser beam while moving the projection position among the plurality of laser projectors and, at the same time, causes the first laser projector 4 to project the visible laser beam while halting the motion of the projection position.

As described above, the second laser projector 3 moves the projection position while the first laser projector 4 fixes the projection position to the target position, decreasing such a probability that the passenger is confused due to simultaneous movement of the projection positions by the plurality of laser projectors.

Further, the laser beam ECU 11 selects the position at the point in the direction of watching detected by the ECU 16, which is the watching direction detector, as the start point and, further, so controls the turn on and off of projection of the laser projector and the projection direction, so that the projection position of the second laser projector 4 starts from the selected start point and moves up to the target point.

Thus, the projection position to which the visible laser beam is projected starts from the point which the driver is watching and is guided up to the target point, enabling the driver to more easily watch the visible laser beam, i.e., to more easily notice the projection of the visible laser beam.

Eleventh Embodiment

Figure 22:
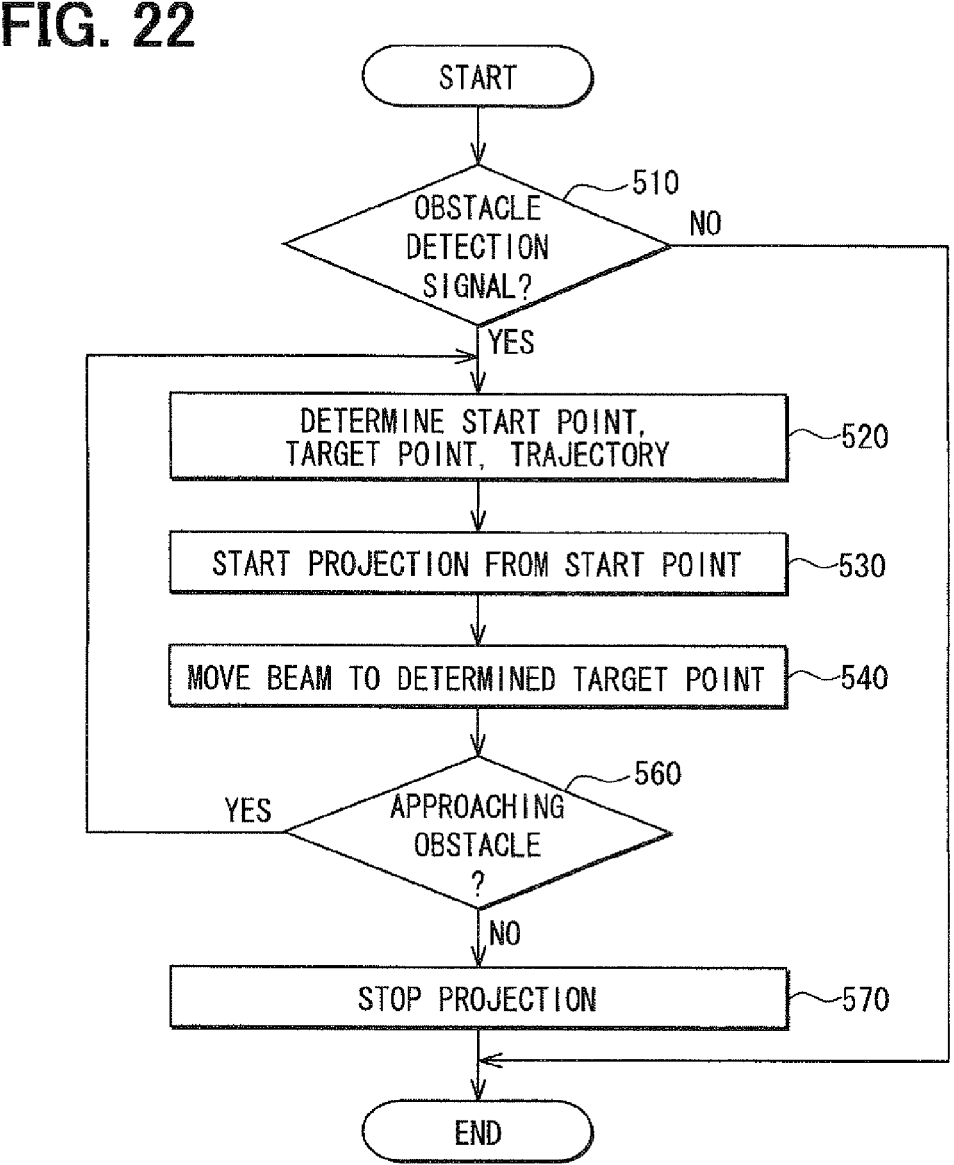
FIG. 22 is a flowchart showing processing executed by a laser beam ECU of a laser beam projection system according to an eleventh embodiment of the present invention.

An eleventh embodiment is different from the first embodiment in that the laser beam ECU 11 repetitively executes processing shown in FIG. 22 instead of executing the processing shown in FIG. 3.

Figure 23:
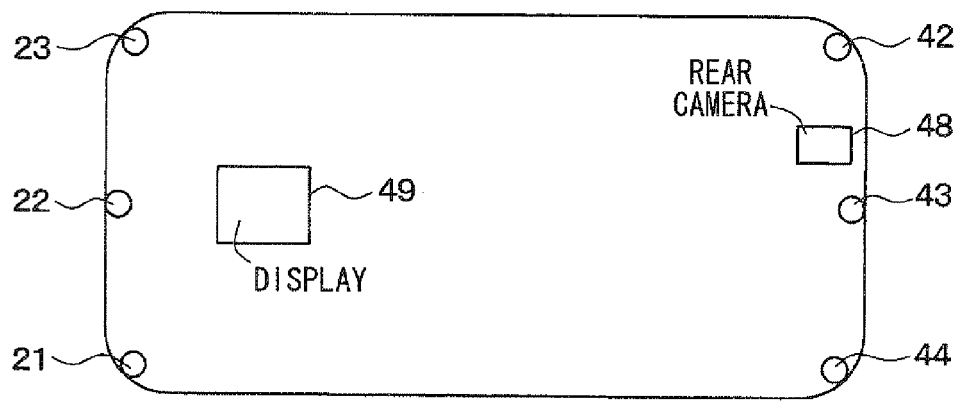
FIG. 23 is a schematic view showing an arrangement of a plurality of side obstacle sensors in a vehicle.

In order to realize this processing, as shown in FIG. 23, the visible laser beam projection system has obstacle sensors 21, 22, 23, 42, 43 and 44 at the front left side of the vehicle, at the front center, at the front right side, at the rear right side, at the rear center and at the rear left side, respectively. The obstacle sensors 21, 22, 23, 42, 43 and 44 detect any obstacle in the directions of the left front, front, right front, right rear, rear and left rear of the vehicle and, further, detect distances from the vehicle up to the obstacles, and outputs the detected results to the laser beam ECU 11. Here, the distances which can be detected by the obstacle sensors 21, 22, 23, 42, 43 and 44 may be of such rough levels that the obstacle is at a remote distance (e.g., 50 cm to 30 cm), at an intermediate distance (e.g., 30 cm to 20 cm) or at a near distance (e.g., not longer than 20 cm), or may be more close distances (e.g., distances of a graduation of a centimeter).

Depending upon from which obstacle sensor 21, 22, 23, 42, 43 or 44 the signal is received, the laser beam ECU 11 detects where in the periphery of the vehicle the obstacle is located. The visible laser beam projection system, further, includes a rear camera 48 for taking images of the rear of the vehicle and a display 49 for displaying to the driver the rear image taken by the rear camera 48.

Upon receipt of an obstacle detection signal from any one of the obstacle sensors (step 510) in the processing of FIG. 22, the laser beam ECU 11 determines the position of the obstacle and the distance to the obstacle based on the received signal, and determines a target point of the projection position to which the visible laser beam is projected, a start point and a trajectory based on the data of the determined position and the distance (step 520).

The selected laser projector is controlled so as to project the visible laser beam onto the determined start point (step 530). The selected laser projector is further so controlled that the projection position arrives at the target point through the determined trajectory (step 540).

It is further determined that whether the obstacle is now approaching based upon whether the obstacle detection signals are still detected by the obstacle sensors 21, 22, 23, 42, 43 and 44 (step 560). If the obstacle is approaching, the processing is executed again through steps 520 to 540. If no obstacle is approaching, projection by the selected laser projector is stopped (step 570).

The target point, the start point and the trajectory may be determined at step 520 in the following manner. If the obstacle detection sensor that has detected an obstacle is the front left obstacle sensor 21, front central obstacle sensor 22 or front right obstacle sensor 23 at step 520, the laser beam ECU 11 determines a range of a target point, a start point and a trajectory (as projection range) at the front end in the compartment 1.

Figure 24:
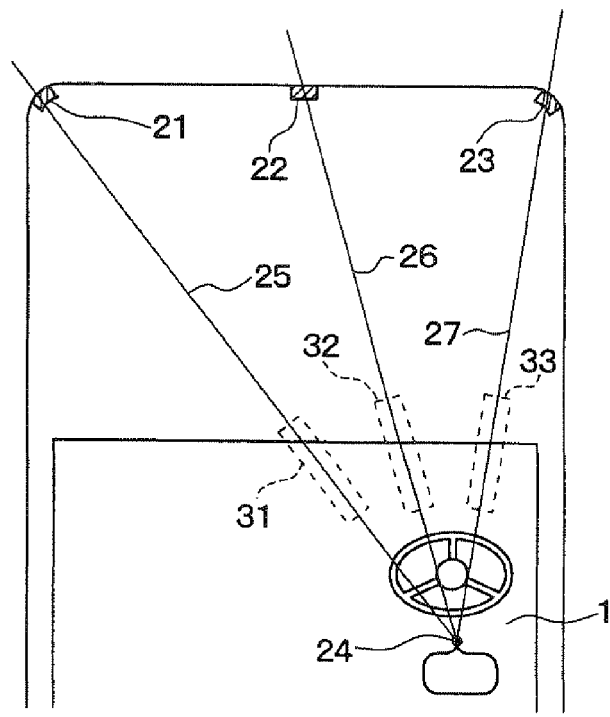
FIG. 24 is a view showing projection ranges to which a visible laser beam is projected when there are obstacles in front of a vehicle.

More specifically as shown in FIG. 24, the projection range is a range along a line that connects a designed (i.e., predetermined imaginary) driver's head position 24 to the obstacle sensor that has detected among the front left obstacle sensor 21, front central obstacle sensor 22 and front right obstacle sensor 23. For example, if the front left obstacle sensor 21 detects an obstacle, the projection range is a region 31 which includes the upper surface 7a of the instrument panel 7 and a hood position over the windshield along an imaginary line 25. Further, if the front central obstacle sensor 22 detects an obstacle, the projection range is a region 32 which includes the upper surface 7a of the instrument panel 7 and a hood position over the windshield along an imaginary line 26. Further, if the front right obstacle sensor 23 detects an obstacle, the projection range is a region 33 which includes the upper surface 7a of the instrument panel and a hood position over the windshield along an imaginary line 27.

Figure 25:
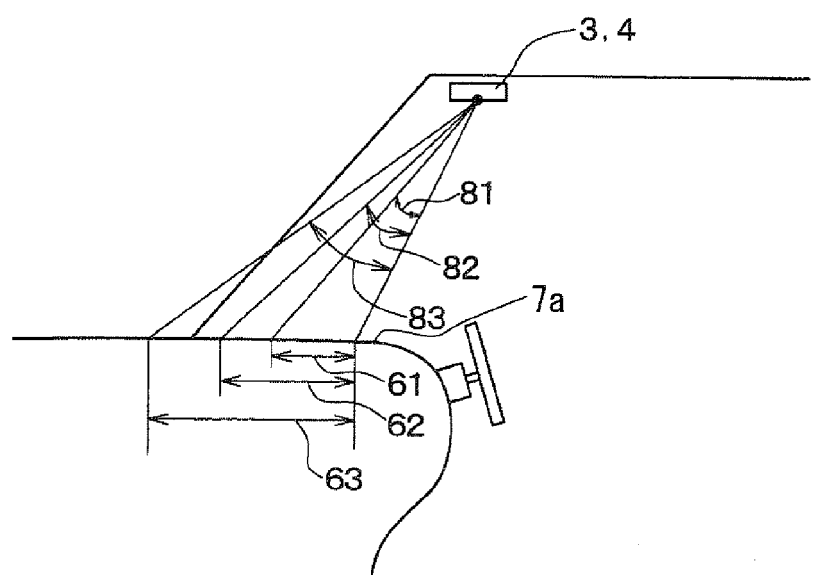
FIG. 25 is a schematic view showing lengths of trajectories of positions to which a visible laser beam is projected when there are obstacles in front of a vehicle.

The start point is a position closest to the driver in the projection range, and the trajectory may be a straight and reciprocal trajectory between the start point and the target point. In this case, the target point is set to be away from the driver's position when the distance is long up to the detected obstacle. Referring, for example, to FIG. 25, if an obstacle is detected to be at a close distance, the length from the start point up to the target point is set to be a minimum length 61 on the upper surface 7a. If the obstacle is detected to be at an intermediate distance, the length from the start point up to the target point is set to be an intermediate length 62 on the upper surface 7a. If the obstacle is detected to be at a remote distance, the length from the start point up to the target point is set to be a maximum length 63 on the upper surface 7a.

At step 540, therefore, the range for changing the angle of the selected laser projector is controlled to correspond to any one of the angular range 81, 82 or 83 depending upon at which one of the close distance, intermediate distance or remote distance the obstacle is present.

As described above, the laser beam ECU 11 controls the turn on/off of projection of the laser projector and the projection direction thereof so that the length of trajectory of the position to which the laser beam is projected increases with an increase in the distance up to the obstacle detected by the obstacle detector, and further controls the turn on/off of projection of the laser projector and the projection direction thereof so that the direction of trajectory of the position to which the laser beam is projected changes following the direction from the driver up to the obstacle. Here, the words "changes following the direction up to the obstacle" means that "if the direction to the obstacle changes in a given direction, the direction of trajectory changes at least in that direction".

As described above, further, the distance to the obstacle increases or decreases depending upon an increase or decrease in the length of the trajectory of the position to which the visible laser beam is projected. Therefore, the driver is enabled to intuitively grasp the distance to the obstacle based upon the display by the visible laser beam. Further, since the direction to the obstacle as viewed from the driver resembles the direction of trajectory of the projection position, the driver is allowed to more intuitively grasp the direction to the obstacle.

At step 520, further, if the obstacle sensor that has detected the obstacle is any one of the rear right obstacle sensor 42, rear central obstacle sensor 43 or rear left obstacle sensor 44, the laser beam ECU 11 so determines the target point as to change following a change in the position on the screen of the display 49 corresponding to the position of the obstacle detected by the rear obstacle distance detector. Here, the words "change following a change in the position on the screen" means that "if the position on the screen moves in a given direction, the target point moves at least in that direction".

Figure 26:
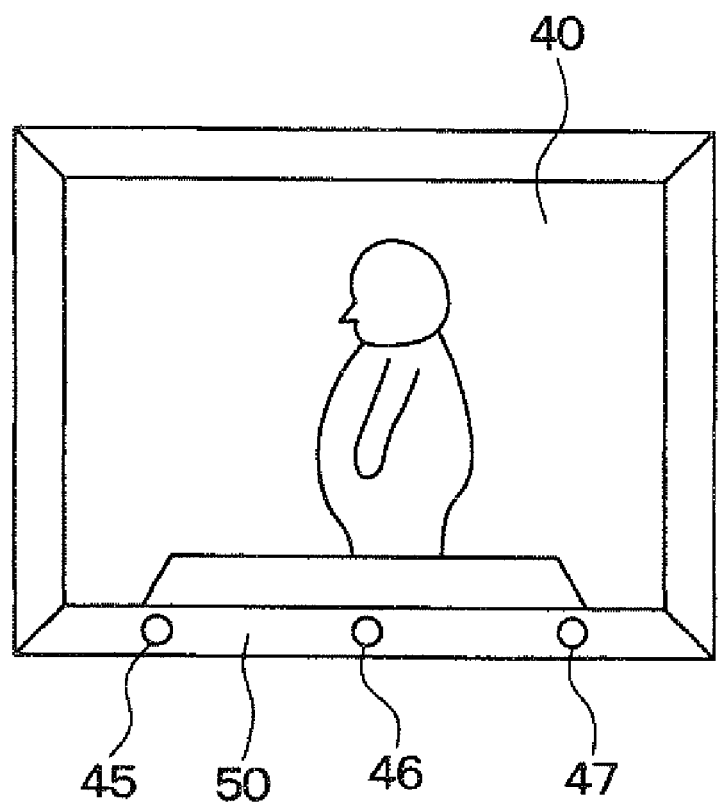
FIG. 26 is a schematic view showing positions to which a visible laser beam is projected when there is an obstacle at a back of a vehicle.

FIG. 26 illustrates a relationship between a display screen 40 of the display 49 that displays the rear of the vehicle and target points 45, 46, 47. In this example, the target points 45 to 47 are the positions of an outer frame 50 arranged surrounding the display screen 40. The point 47 on the right is regarded to be a target point when the rear right obstacle sensor 42 has detected the obstacle, the point 46 in the center is regarded to be a target point when the rear central obstacle sensor 43 has detected the obstacle, and the point 45 on the left is regarded to be a target point when the rear left obstacle sensor 44 has detected the obstacle.

Here, the start point that is determined may or may not be the same position as the target point. Further, the trajectory that is determined may be a trajectory that remains stilt (no trajectory) or may be any other trajectory.

At step 540, the projection direction of the selected laser projector is changed depending upon at which one of the right, left or central position on the screen 40 displaying the rear image the obstacle at the rear is located according to the result of step 520.

At step 540, further, the color and brightness of the visible laser beam projected onto the target points 45, 46, 47 of FIG. 26 may be changed depending upon the distance to the obstacle relying upon the technology as described in the third and fourth embodiments. For example, a green light may be turned on at all times if the obstacle is at a remote distance, the green light may be flashed if the obstacle is at an intermediate distance, and a red color may be turned on at all times if the obstacle is at a close distance.

As described above, since the position or presence of an obstacle is displayed by projecting the visible laser beam onto the display displaying the rear image which is at rearward angles from the driver, the passenger is allowed to intuitively grasp the presence of the obstacle owing to the display by the visible laser beam.

Other Embodiments

The above embodiments may be modified in many ways.

According to the above embodiments, for example, the ECUs 12, 14 and 16 calculate the data inside and outside of the vehicle, checks whether the display by the visible laser beam is necessary based on the data that are calculated, specify the object to which the visible laser beam is to be projected if it is determined that the display is necessary, and output to the laser beam ECU 11 the visible laser beam projection instruction signal inclusive of data of the specified object to which the visible laser beam is to be projected.

However, the ECUs 12, 14 and 16 may calculate the data inside and outside of the vehicle, and may output the calculated data to the laser beam ECU 11 directly. In this case, the laser beam ECU 11 may check based on the received data whether the display by the visible laser beam is necessary. If it is determined that the display is necessary, then the laser beam ECU 11 may specify the object to which the visible laser beam is to be projected.

Further, the trajectory of the projection position is not limited to the one described above, but may be the one necessarily tracing a circular trajectory at the start point of starting the projection of the visible laser beam or may be the one necessarily tracing the circular trajectory at the target point.

In the first embodiment, further, the trajectory of the position to which the visible laser beam is projected changes depending upon the action requested for the driver. However, a rotary trajectory may be employed when a point must be specified by the visible laser beam, and a reciprocal trajectory in a given direction may be employed when that direction must be specified.

In the second embodiment, further, the direction of motion of a two-wheeled vehicle or a vehicle around the vehicle may be specified by using obstacle distance sensors that repetitively detect the distance up to the obstacle around the vehicle.

In the third embodiment, further, the mode of changing the brightness may be determined at step 125 in FIG. 12 in a manner that the flashing or blinking period is shortened with an increase in the degree of urgency of the conditions inside and outside of the vehicle serving as a cause for projecting the visible laser beam.

According to the fourth embodiment, further, in order to control the projection color, the laser projector 3 and the laser projector 4 may project visible laser beams of different colors (e.g., red and green). In this case, the laser beam ECU 11 causes at some moments the laser projector 3 only to project the laser beam onto the projection portion so that the projected position is illuminated, for example, in red, causes at some moments the laser projector 4 only to project the laser beam onto the projection portion so that the projected position is illuminated, for example, in green, and causes at some moments the laser projector 3 as well as the laser projector 4 to project the laser beams onto the projection portion simultaneously so that the projected position is illuminated, for example, in yellow.

In the fifth embodiment, further, the mode of producing sound may be changed depending upon where the projection position on the trajectory is now being projected with the visible laser beam (e.g., depending upon the degree of progress of the projected position on the trajectory). For example, predetermined different sounds may be produced from the speaker 8 at the start of projection, when the projected position is moving and at the end of projection.

In the seventh embodiment, further, the moving speed of the projected position may be varied depending upon where the projection position on the trajectory is now being projected with the visible laser beam (e.g., depending upon the degree of progress of the projected position on the trajectory). For example, the moving speed may be increased as the projected position approaches the target point.

In the eleventh embodiment, further, the functions for specifying the position of the obstacle and the distance to the obstacle based on the signals from a plurality of obstacle sensors, may be executed by other ECUs instead of the laser beam ECU 11. In this case, the other ECUs may output to the laser beam ECU 11 the data of the position of the detected obstacle and of the distance to the obstacle.

In the eleventh embodiment, further, if an obstacle is detected at the rear, the projection position is determined around the screen of the display 49. In this case, the target point may be determined on the display 49 so as to change following a change in the position on the screen of the display 49 corresponding to the position of the obstacle detected by the rear obstacle distance detector.

The laser projectors 3 and 4 are not limited to be mounted to the ceiling 2 but may be mounted at any positions if the visible laser beams can be projected in the compartment 1. Further, the position where the indoor camera 5 is mounted is not limited to the ceiling portion 2 but may be any place if an image of the face of the driver 9 can be taken. The essential requirements of the visible laser beam projection system include either the laser projector 3 or the laser projector 4 and the laser beam ECU 11 only. Therefore, other requirements may not be included in the visible laser beam projection system.

What is claimed is:

1. A visible laser beam projection system mounted in a compartment of a vehicle, said system comprising:
   a laser projector for projecting a visible laser beam in the compartment; and
   a control unit for controlling a turn on/off of projection of the laser projector and a projection direction thereof,
   wherein the control unit is configured to
      (1) under a first condition, select a first target point in the compartment and control the turn on/off of projection of the laser projector and the projection direction so that the projection position of the laser projector starts from a start point in the compartment and moves to the selected first target point, and
      (2) under a second condition different from the first condition, select a second target point in the compartment different from the first target point and control the turn on/off of projection of the laser projector and the projection direction so that the projection position of the laser projector starts from said start point and moves to the selected second target point.

2. A visible laser beam projection system mounted in a compartment of a vehicle as in claim 1,
   wherein the control unit is further configured to select said start point out of a plurality of start point candidates in the compartment based on data of conditions inside the vehicle or of external environment, and control the turn on/off of projection of the laser projector and the projection direction so that a projection position of the laser projector starts from the selected said start point.

3. A visible laser beam projection system mounted in a compartment of a vehicle as in claim 1,
wherein the control unit is further configured to
(1) under said first condition, select a first trajectory of motion in the compartment and control the turn on/off of projection of the laser projector and the projection direction so that the projection position of the laser projector traces the selected first trajectory of motion, and
(2) under said second condition, select a second trajectory of motion in the compartment different from the first trajectory of motion and control the turn on/off of projection of the laser projector and the projection direction so that the projection position of the laser projector traces the selected second trajectory of motion.

4. A visible laser beam projection system mounted in a compartment of a vehicle as in claim 1, further comprising:
a moving direction sensor for detecting a direction in which a body moves outside the vehicle; and
wherein said control unit is further configured to select a trajectory of motion along the direction in which the body moves as detected by the moving direction sensor, and to control the turn on/off of projection of the laser projector and the projection direction so that the projection position of the laser projector traces the selected trajectory of motion.

5. The visible laser beam projection system according to claim 4, wherein:
when the body detected by the moving direction sensor is a person, the control unit selects a trajectory of motion that proceeds in a zig-zag manner over the vertexes extending in a zig-zag manner in a direction in which the body moves, and controls the turn on/off of projection by the laser projector and the projection direction so that the projection position projected by the laser projector traces the selected trajectory of motion.

6. The visible laser beam projection system according to claim 4, wherein:
when the body detected by the moving direction sensor is a two-wheeled vehicle, the control unit controls the turn on/off of projection by the laser projector and the projection direction so that the projection position projected by the laser projector traces the selected trajectory of motion, and further controls the laser projector so that a shape of the visible laser beam projected onto the projection position from the laser projector becomes two circles or arcs.

7. A visible laser beam projection system mounted in a compartment of a vehicle as in claim 1,
wherein the control unit is further configured to
(1) under said first condition, select a first brightness changing mode and control an intensity of projection of the laser projector so that a position in the compartment is projected with the selected first brightness changing mode, and
(2) under said second condition different from the first condition, select a second brightness changing mode different from the first brightness changing mode and control the intensity of projection of the laser projector so that the position in the compartment is projected with the selected second brightness changing mode.

8. A visible laser beam projection system mounted in a compartment of a vehicle as in claim 1,
wherein the control unit is further configured to
(1) under said first condition, select a first projection color and control the projection color of the laser projector so that the position in the compartment is projected with the selected first projection color, and
(2) under said second condition different from the first condition, select a second projection color different from the first projection color and control the projection color of the laser projector so that the position in the compartment is projected with the selected second projection color.

9. A visible laser beam projection system mounted in a compartment of a vehicle as in claim 1, further comprising:
a sound producing device for producing sound in the compartment; and
wherein the control unit is further configured to
(1) under said first condition, select a first kind of sound and cause the laser projector to project the visible laser beam onto a position in the compartment and the sound output device to produce the sound corresponding to the selected first kind of sound, and
(2) under said second condition different from the first condition, select a second kind of sound different from the first kind of sound, and cause the laser projector to project the visible laser beam onto the position in the compartment and the sound output device to produce the sound corresponding to the selected second kind of sound.

10. A visible laser beam projection system mounted in a compartment of a vehicle as in claim 1,
wherein the control unit is further configured to
(1) under said first condition, select a first moving speed and control the projection direction of the laser projector so that a moving speed of the position projected by the laser projector becomes the selected first moving speed, and
(2) under said second condition different from the first condition, select a second moving speed different from the first moving speed and control the projection direction of the laser projector so that the moving speed of the position projected by the laser projector becomes the second moving speed.

11. A visible laser beam projection system mounted in a compartment of a vehicle as in claim 1,
wherein the control unit is further configured to
(1) under said first condition, select a first diffusion rate and so control the laser projector that the diffusion rate of flux of light projected by the laser projector assumes the selected first diffusion rate, and
(2) under said second condition, select a second diffusion rate different from the first diffusion rate and so control the laser projector that the diffusion rate of the flux of light projected by a laser projector assumes the second diffusion rate.

12. A visible laser beam projection system mounted in a compartment of a vehicle as in claim 1,
wherein the control unit is further configured to select an object to be projected, determine the shape of the selected object to be projected based on data of correspondence between the object to be projected and the shape thereof, and control the laser projector so that the visible laser beam is projected in the determined shape onto the position of the selected object to be projected.

13. A visible laser beam projection system mounted in a compartment of a vehicle as in claim 1, further comprising:
a plurality of laser projectors for projecting visible laser beams from different positions in the compartment; and wherein the control unit is further configured to control, in case the plurality of laser projectors are requested to project the visible laser beams simultaneously, the requested laser projectors not to change simultaneously projection positions to which the visible laser beams are to be projected.

14. A visible laser beam projection system mounted in a compartment of a vehicle as in claim 1, wherein:
first and second projectors are used for projecting first and second visible laser beams from different positions to first and second projection positions in the compartment, respectively; and
wherein the control unit is further configured to cause the first laser projector to project the first visible laser beam while moving the first projection position, and, at the same time, cause the second laser projector to project the second visible laser beam while fixing the second projection position.

15. A visible laser beam projection system mounted in a compartment of a vehicle as in claim 1, further comprising:
an obstacle distance detector for detecting a distance to an obstacle around the vehicle; and
wherein the control unit is further configured to control the turn on/off of projection of the laser projector and the projection direction so that a length of trajectory of the position to which the laser beam is projected increases with an increase in the detected distance to the obstacle.

16. A visible laser beam projection system mounted in a compartment of a vehicle as in claim 1, wherein:
said laser projector projects a visible laser beam on or around a display screen of an image display device which displays an image taken by a camera that takes images of a rear of the vehicle,
the system further comprising
a rear obstacle distance detector for detecting a position of an obstacle at the rear of the vehicle; and
wherein the control unit is further configured to control the turn on/off of projection of the laser projector and the projection direction so that the position projected with the visible laser beam changes following a change in the position on the display screen that corresponds to the position of the obstacle detected by the rear obstacle distance detector.

17. A visible laser beam projection system mounted in a compartment of a vehicle as in claim 1, further comprising:
a watching direction detector for detecting a direction in which a driver is watching in the compartment; and
wherein the control unit is further configured to select, as said start point, a watching point in the watching direction detected by the watching direction detector, and further control the turn on/off of projection of the laser projector and the projection direction, so that the projection position of the laser projector starts from the selected start point and moves to a target point.

18. A method for operating a visible laser beam projection system mounted in a compartment of a vehicle, said method comprising:
using a laser projector to project a visible laser beam in the compartment; and
using at least one programmed computer to control a turn on/off of projection of the laser projector and a projection direction thereof,
wherein
(1) under a first condition, a first target point is selected in the compartment and the turn on/off of projection of the laser projector and the projection direction are controlled so that the projection position of the laser projector starts from a start point in the compartment and moves to the selected first target point, and
(2) under a second condition different from the first condition, a second target point is selected in the compartment different from the first target point and the turn on/off of projection of the laser projector and the projection direction are controlled so that the projection position of the laser projector starts from said start point and moves to the selected second target point.

* * * * *